(12) United States Patent
Koide et al.

(10) Patent No.: US 7,599,557 B2
(45) Date of Patent: Oct. 6, 2009

(54) IMAGE SEGMENTATION APPARATUS, IMAGE SEGMENTATION METHOD, AND IMAGE SEGMENTATION INTEGRATED CIRCUIT FOR PROCESSING AN IMAGE

(75) Inventors: Tetsushi Koide, Higashihiroshima (JP); Hans Jurgen Mattausch, Higashihiroshima (JP); Takashi Morimoto, Higashihiroshima (JP); Youmei Harada, Higashihiroshima (JP)

(73) Assignee: Hiroshima University, Higashihiroshima-shi (JP)

( * ) Notice: Subject to any disclaimer, the term of this patent is extended or adjusted under 35 U.S.C. 154(b) by 0 days.

(21) Appl. No.: 12/098,650

(22) Filed: Apr. 7, 2008

(65) Prior Publication Data
US 2008/0187223 A1 Aug. 7, 2008

Related U.S. Application Data

(62) Division of application No. 10/915,559, filed on Aug. 11, 2004, now Pat. No. 7,526,127.

(30) Foreign Application Priority Data
Sep. 12, 2003 (JP) ............................. 2003-322163

(51) Int. Cl.
*G06K 9/34* (2006.01)
(52) U.S. Cl. ..................................... 382/173; 382/307

(58) Field of Classification Search .......... 382/173–180
See application file for complete search history.

(56) References Cited

U.S. PATENT DOCUMENTS 7,298,899 B2   11/2007   Koide et al. ................. 382/173

FOREIGN PATENT DOCUMENTS

| JP | 8-167028 | 6/1996 |
| JP | 2003-44850 | 2/2003 |
| JP | 2003-346142 | 12/2003 |

OTHER PUBLICATIONS

Large-Image CNN hardware processing using a time multiplexing scheme Pineda de Gyvez, J. Lei Wang Sanchez-Sinencio, E. Cellular Neural Networks and their Applications, 1996. CNNA-96. Proceedings., 1996 Fourth IEEE International Workshop on Publication Date: Jun. 24-26, 1996 On pp. 405-410.*

(Continued)

*Primary Examiner*—Bhavesh M Mehta
*Assistant Examiner*—Sean Motsinger
(74) *Attorney, Agent, or Firm*—Oblon, Spivak, McClelland, Maier & Neustadt, L.L.P.

(57) ABSTRACT

In a boundary active only scheme proposed by the present invention, only a cell in a boundary of region growth is brought into an active mode, and the other cells are brought into a standby mode. The respective cells perform state transition in parallel, and decision of the state transition performed for each clock cycle is not performed in a case where any of the three conditions that none of the adjacent cells is ignited, the cell itself is already ignited, and the cell already belongs to a certain divided region is satisfied. Therefore the number of simultaneously operating cells and that of coupling weight registers are minimized, and control is automatically executed to reduce power consumption.

11 Claims, 26 Drawing Sheets

OTHER PUBLICATIONS

Suchendra M. Bhandarkar, et al., "Image Segmentation Using Evolutionary Computation", IEEE Transactions on Evolutionary Computation, vol. 3, No. 1, Apr. 1999, pp. 1-21.

Hiroshi Ando, et al., "A Nonlinear Oscillator Network for Gray-Level Image Segmentation and PWM/PPM Circuits for Its VLSI Implementation", IEICE Trans. Fundamentals, vol. E83-A, No. 2, Feb. 2000, pp. 329-336.

Hiroshi Ando, et al., "Image Segmentation/Extraction Using Nonlinear Cellular Networks and Their VLSI Implementation Using Pulse-Modulation Techniques", IEICE Trans. Fundamentals, vol. E85-A, No. 2, Feb. 2002, pp. 381-388.

Tetsushi Koide, et al., "Digital Gray-Scale/Color Image-Segmentation Architecture for Cell-Network-Based Real-Time Applications", 5 Pages.

Takashi Morimoto, et al., "Real-Time Segmentation Architecture of Gray-Scale/Color Motion Pictures and Digital Test-Chip Implementation", 4 Pages.

Takashi Morimoto, et al., "Low-Complexity, Highly-Parallel Color Motion-Picture Segmentation Architecture for Compact Digital CMOS Implementation", 2 Pages.

J. C. Russ, "The Image Processing Handbook", CRC Press 1999, 39 Pages.

Sudeep Sarkar, et al., "Integration, Inference, and Management of Spatial Information Using Bayesian Networks: Perceptual Organization", IEEE Transactions on Pattern Analysis and Machine Intelligence, vol. 15, No. 3, Mar. 1993, pp. 256-268.

DeLiang Wang, et al., "Image Segmentation Based on Oscillatory Correlation", Neural Computation, vol. 9, 1997, No. 4, pp. 1-30.

Takashi Morimoto, et al. "Gray-Scale/Color Image-Segmentation Architecture Based on Cell Network", Technical Research Report of IEICE, vol. 102, No. 102, No. 162, Jun. 21, 2002, pp. 49-54.

\* cited by examiner

- 33×25 pixel block
  Measurement time at 10MHz : 15 μsec
  Measurement power loss at 10MHz : 19.8mW

- Total processing time at 10MHz : 8.64msec
  Segmentation−(20×20) block×15 μsec=6msec
  Data input/output−(20×20) block×0.1 μsec×66cycles=2.64msec

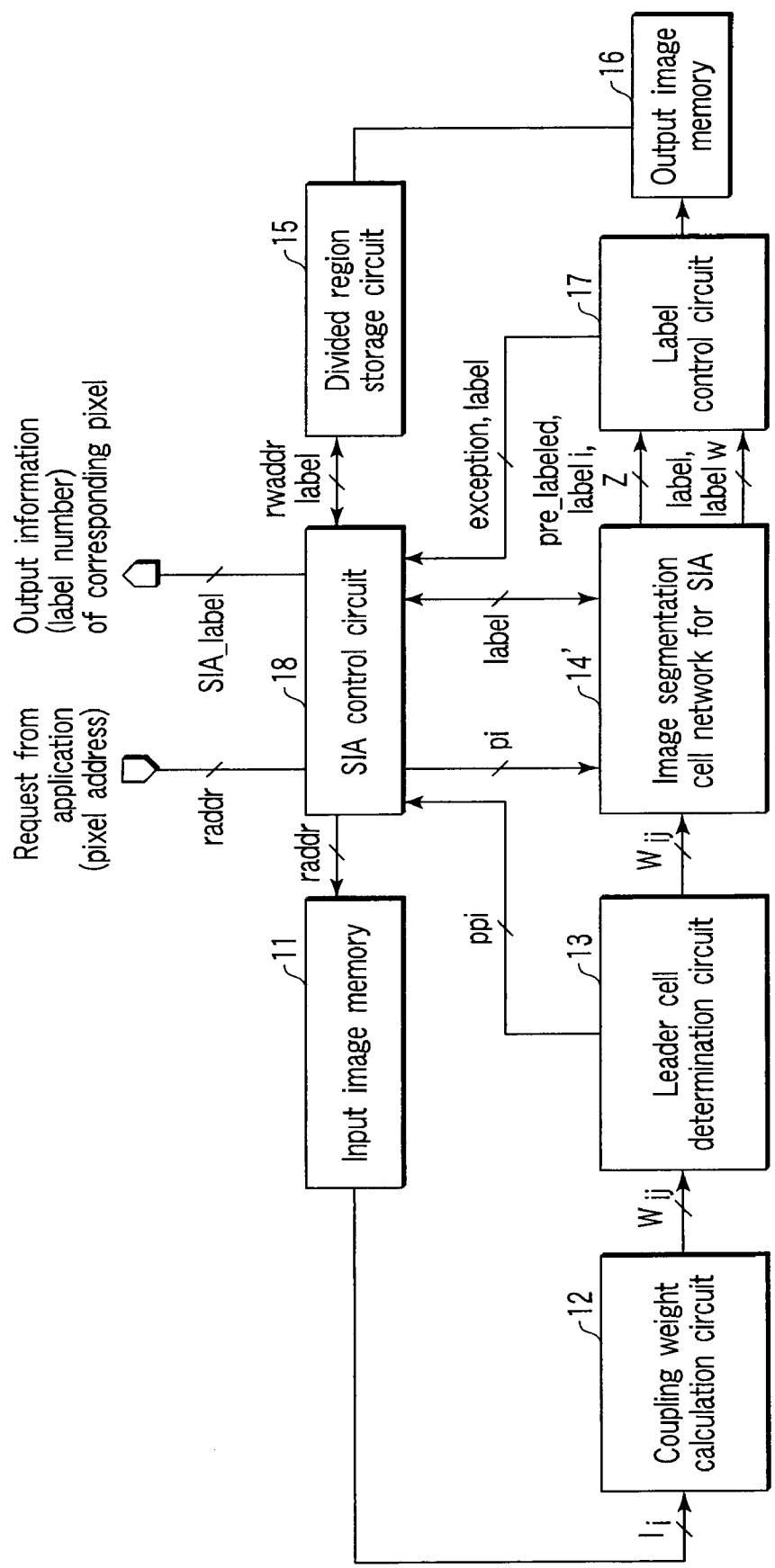
F I G. 22

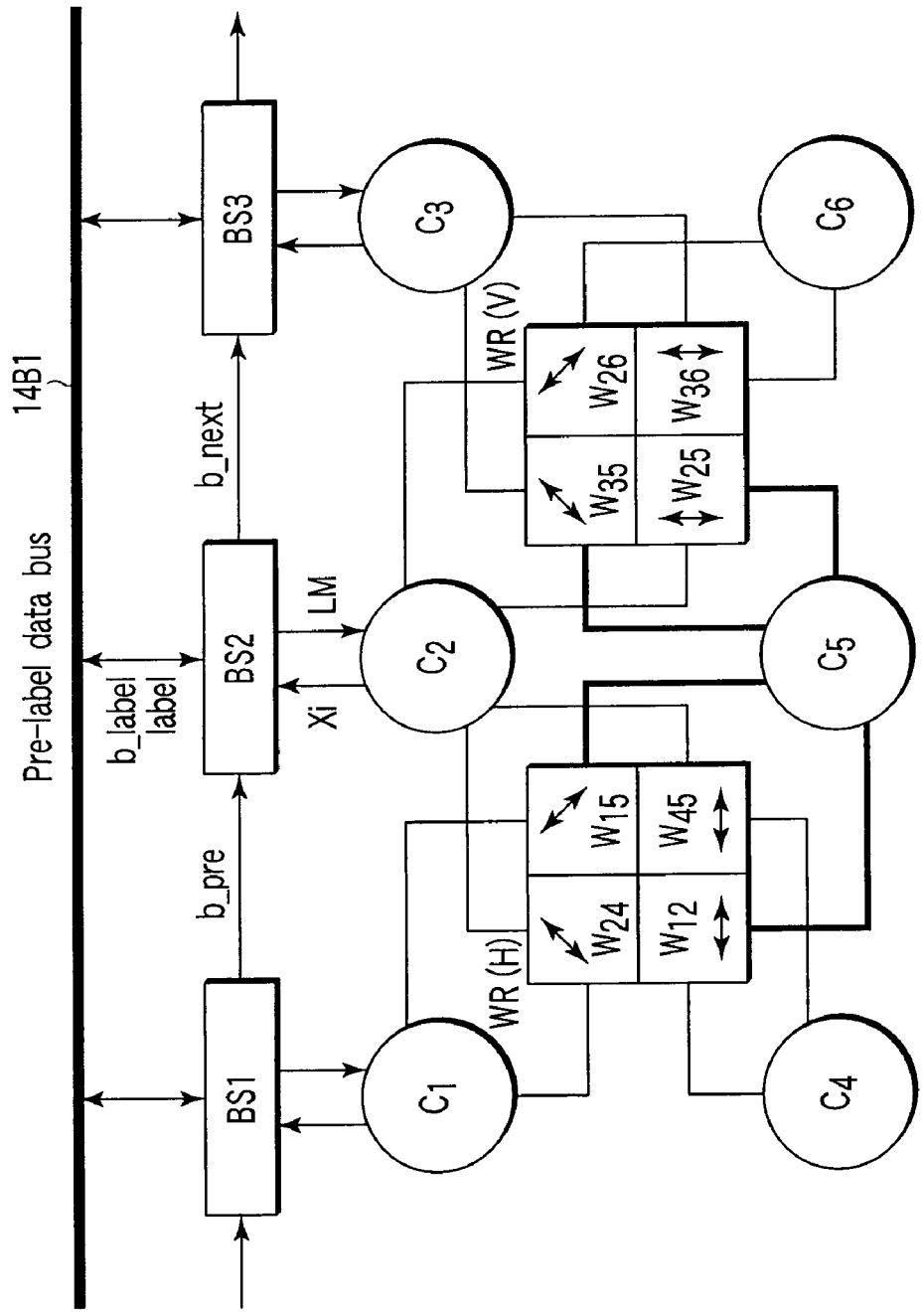
F I G. 24

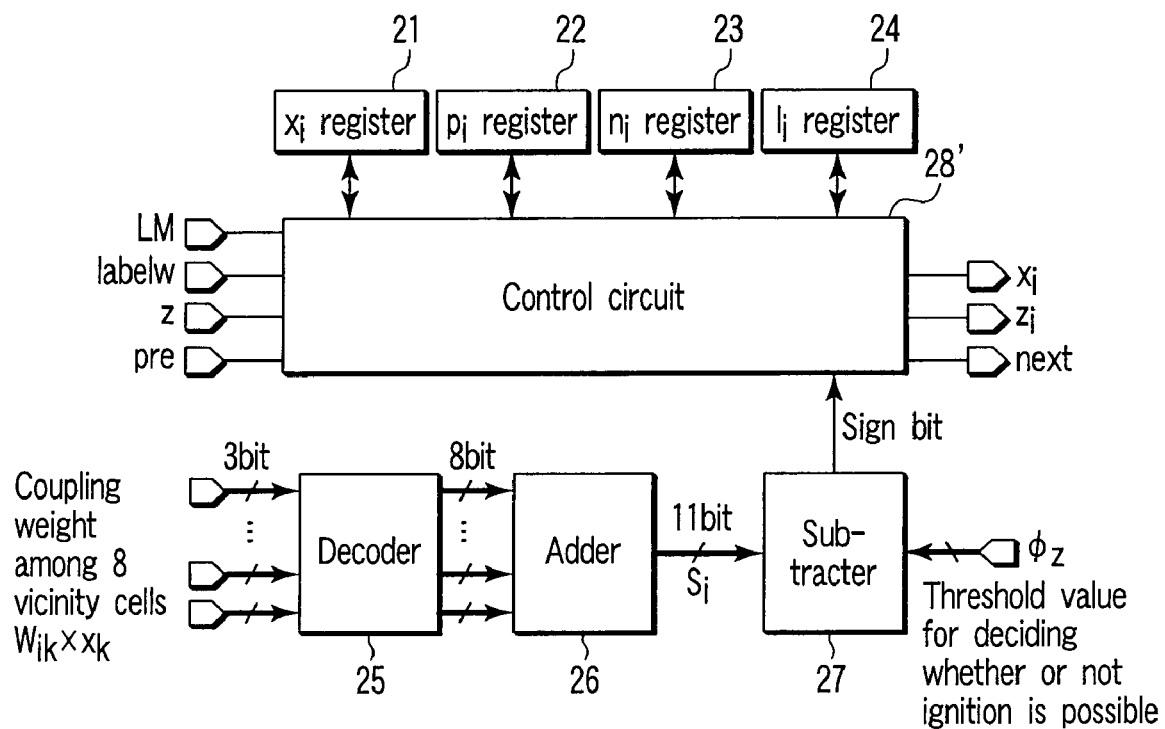
F I G. 25
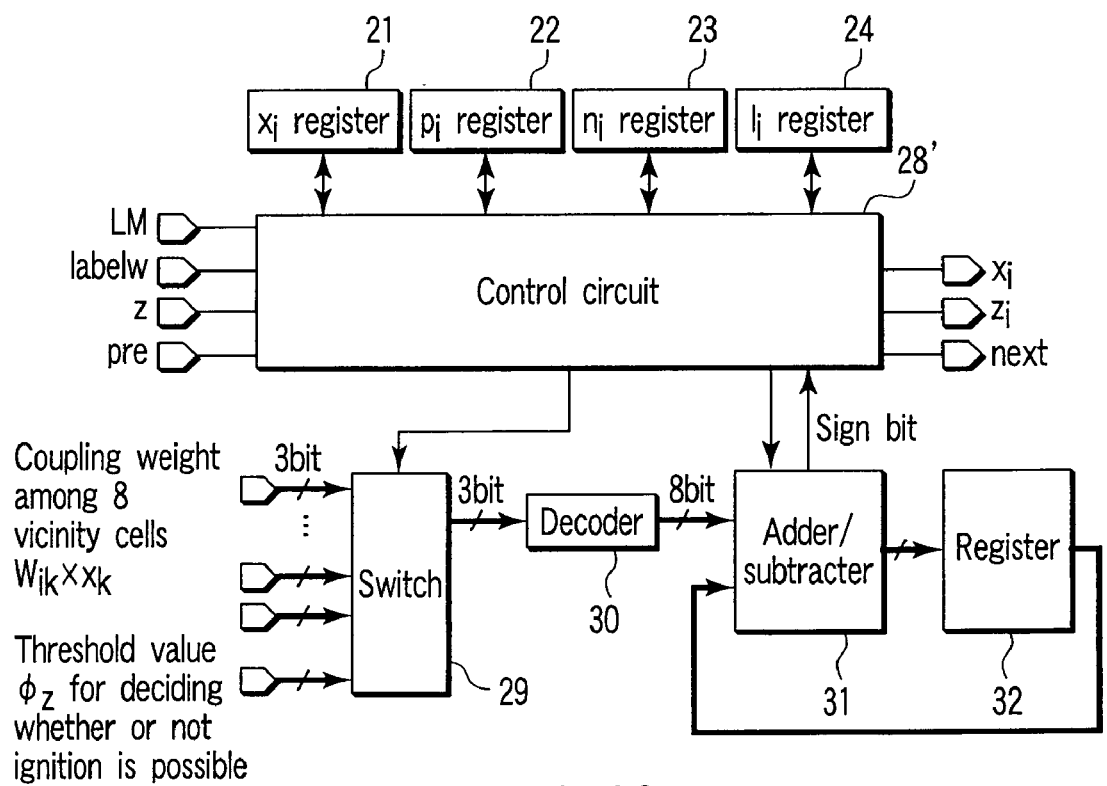
F I G. 26

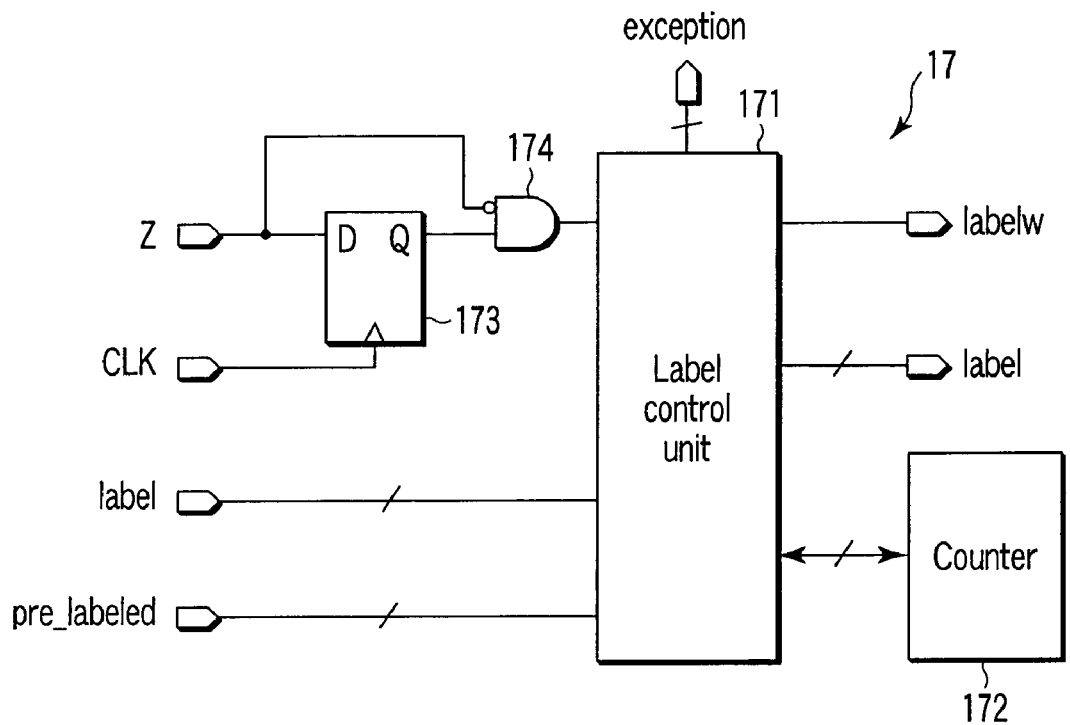
F I G. 28
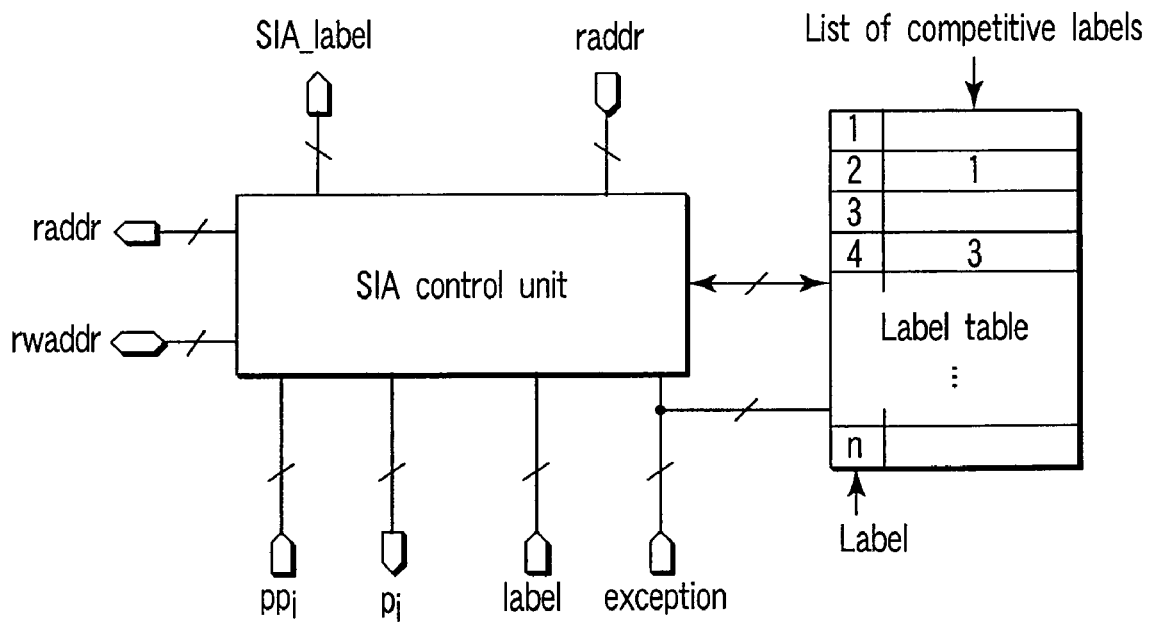
F I G. 29

IMAGE SEGMENTATION APPARATUS, IMAGE SEGMENTATION METHOD, AND IMAGE SEGMENTATION INTEGRATED CIRCUIT FOR PROCESSING AN IMAGE

CROSS-REFERENCE TO RELATED APPLICATIONS

This application is a Divisional of and claims the benefit of priority under 35 USC § 120 from U.S. Ser. No. 10/915,559, filed Aug. 11, 2004 and claims the benefit of priority from the prior Japanese Patent Application No. 2003-322163, filed Sep. 12, 2003, the entire contents of which are incorporated herein by reference.

BACKGROUND OF THE INVENTION

1. Field of the Invention

The present invention relates to an image segmentation apparatus for image processing, which recognizes an image or detects movement in real time, an image segmentation method, and an image segmentation integrated circuit.

2. Description of the Related Art

In image segmentation, individual objects (e.g., mobile objects such as a human face and car) are taken from a complicated natural image taken as an input, and this processing is basic and indispensable for performing image processing which is object-based processing, such as image recognition and movement detection.

Various image segmentation methods have heretofore been proposed, and these methods are roughly classified into:

(1) a method based on a contour line [see Documents 7, 8, for example];

(2) a method based on a region [see Document 7, for example]; and (3) a method in which both (1) and (2) are combined [see Document 7, for example] or a method of formulating a combined optimization problem [see Document 1, for example].

However, processing in software is assumed in an image segmentation method with respect to a color or gray scale value, which has heretofore been proposed. Therefore, since complicated processing is required, the time required for the processing is long. Since the algorithm is complicated, it is difficult to realize the algorithm in a small area such as hardware, and it is difficult to process the image in real time (about several msec). Furthermore, various exclusive-use algorithms are required for segmenting a natural color or gray scale image. To realize the real-time processing, hardware acceleration is indispensable.

Additionally, in recent years, there has been a rising demand for an image recognition technique in order to realize an intellectual information processing technique. Especially, it is necessary to process visual information (information on a natural image) taken from a camera or the like in realizing an intelligent robot which operates or makes decisions like a human or in recognizing faces or mobile objects in real time. Since the amount of visual information is generally enormous, a considerably long processing time is required for the processing with a general-purpose computer or the like. In the control of the robot and the image recognition, a demand for a processing rate of the visual information becomes severe, and high-speed processing in real time is required.

Therefore, in recent years, to deal with the image processing in which the real-time processing is indispensable, such as the control of the intelligent robot and the recognition of the mobile object, various image segmentation algorithms [see Documents 4, 7, 9, for example] and an image segmentation circuit by hardware for the real-time processing [see Documents 2, 3, 5, 6, for example] have been intensively researched.

However, in a conventional integrated circuit realized as hardware, since a high-speed property is regarded as important, there is a problem that power consumption or chip area increases. Therefore, it has been difficult to realize an image segmentation circuit with respect to a large image size from viewpoints of the power consumption and chip area.

[Document 1] S. M. Bhandarkar and H. Zhang, "Image segmentation using evolutionary computation", IEEE Trans. on Evolutionary Computation, Vol. 3, No. 1, (1999).

[Document 2] H. Ando, T. Morie, M. Nagata, and A. Iwata, "A nonlinear oscillator network for gray-level image segmentation and PWM/PPM circuits for its VLSI implementation", IEICE Transactions on Fundamentals, E83-A(2), pp. 329 to 336, 2000.

[Document 3] H. Ando, T. Morie, M. Miyake, M. Nagata, and A. Iwata, "Image segmentation/extraction using nonlinear cellular networks and their VLSI implementation using pulse-modulation techniques", IEICE Transactions on Fundamentals, E85-A(2), pp. 381 to 388, 2002.

[Document 4] T. Koide, T. Morimoto, Y. Harada, and H. J. Mattausch, "Digital gray-scale/color image-segmentation architecture for cell-network-based real-time applications", In Proceedings of International Technical Conference on Circuits/Systems, Computers and Communications (ITC-CSCC2002), pp. 670 to 673, 2002.

[Document 5] T. Morimoto, Y. Harada, T. Koide, and H. J. Mattausch, "Real-time segmentation architecture of gray-scale/color motion pictures and digital test-chip implementation", In Proceedings of 2002 IEEE Asia-Pacific Conference on ASICs (AP-ASIC2002), pp. 237 to 240, 2002.

[Document 6] T. Morimoto, Y. Harada, T. Koide, and H. J. Mattausch, "Low-complexity, highly-parallel color motion-picture segmentation architecture for compact digital CMOS implementation", In Extended Abstracts of the 2002 International Conference on Solid State Devices and Materials (SSDM2002), pp. 242 to 243, 2002.

[Document 7] J. C. Russ, "The Image Processing Handbook", pp. 371 to 429, CRC PRESS, 1999.

[Document 8] S. Sarkar and K. L. Boyer, "Integration inference, and management of spatial information using Bayesian networks: Perceptual organization", IEEE Transactions on Pattern Analysis and Machine Intelligence, 15(3), pp. 256 to 274, 1993.

[Document 9] D. L. Wang and D. Terman, "Image segmentation based on oscillator correlation", Neural Computation, 9(4), pp. 805 to 836, 1997.

[Document 10] Jpn. Pat. Appln. KOKAI Publication No. 2003-346142, "Image Segmentation Method, Image Segmentation Apparatus, Real-Time Image Processing Method, Real-Time Image Processing Apparatus, and Image Processing Integrated Circuit".

BRIEF SUMMARY OF THE INVENTION

An object of the present invention is to propose a color/gray-scale image segmentation architecture which realizes real-time processing at a lower power consumption even with a large-scaled image, and to provide an image segmentation apparatus which can be realized by a digital circuit using the architecture, and an image segmentation integrated circuit.

According to the present invention, there is provided an image segmentation method in which a region belonging to the same category is specified from an input image by a pixel unit to identify an image segmentation region, the method comprising:

an initialization step including a step of bringing all of a plurality of cells, which are disposed for each pixel of the input image and which shift in non-ignited, self-ignitable, and ignited states, into the non-ignited state, a step of calculating a coupling weight of each of the plurality of cells with the adjacent cell based on a pixel value of the pixel corresponding to each of the plurality of cells, a step of determining one or more leader cells constituting candidates of self-ignitable cells from the plurality of cells based on a calculation result of the coupling weight, and a step of setting a global suppressor which is a variable to determine whether or not a cell being ignited exists in the plurality of cells to an initial value;

a first detection step of detecting the leader cell as the self-ignitable cell in order from the plurality of cells;

a self-ignition step of shifting the self-ignitable cell detected in the first detection step into the ignited state;

a second detection step of detecting an ignitable cell from the adjacent cells based on the coupling weight calculation result with the respective adjacent cells with respect to the cells in the ignited state including the leader cell;

an ignition step of bringing the cell detected in the second detection step into the ignited state; and an extinguishing step of bringing all the cells in the ignited state in an extinguished state in a case where the corresponding cell is not detected in the second detection step, the method including: a first processing routine of repeatedly performing the processing of the ignition step until the corresponding cell is not detected in the second detection step to complete the image segmentation of a region; and a second processing routine of repeatedly performing a series of processing by the self-ignition step, the second detection step, the ignition step, and the extinguishing step until there is no leader cell in the non-ignited state in the first detection step to complete the image segmentation of all the regions, the first processing routine including: operating the plurality of cells in parallel; calculating a sum of coupling weights in accordance with the state of each adjacent cell; and detecting a cell whose sum is not less than a certain threshold value as the ignitable cell and successively shifting the cell into the ignited state to grow a divided region, while bringing only a cell in a boundary of the growth into an active mode, bringing the other cells into a standby mode, operating only the cell in the active mode, and omitting the processing of the cells in the standby mode.

According to the present invention, there is provided to an image segmentation apparatus in which a region belonging to the same category is specified from an input image by a pixel unit to identify an image segmentation region, and an image of an optional image segmentation region is selectively output, the apparatus comprising:

an input image memory in which each pixel value of the input image is stored;

a cell network including a plurality of cells which are disposed for each pixel of the input image and which shift in non-ignited, self-ignitable, and ignited states, and a plurality of coupling weight registers disposed between the adjacent cells in the plurality of cells to hold a coupling weight between the cells;

a coupling weight calculation circuit which calculates the coupling weight between the adjacent cells based on the pixel value corresponding to each of the plurality of cells, the calculated coupling weight being held in the plurality of coupling weight registers;

a leader cell determination circuit to determine a cell whose sum of coupling weights with the adjacent cell exceeds a standard value as the leader cell based on the coupling weight calculated by the coupling weight calculation circuit;

region distinguishing means for repeatedly executing the processing including deciding from a held value of the coupling weight register disposed adjacent to each of the plurality of cells whether or not ignition is possible, shifting the leader cell determined by the leader cell determination circuit into the ignited state in order, and selecting the ignitable cell from the adjacent cells to shift the ignitable cell into the ignited state, and distinguishing the image segmentation region from the region of the cell brought into the ignited state;

a divided region storage circuit to store information of all the cells in which the image segmentation region is distinguished; and an output image memory in which the pixel value corresponding to each cell of an optional image segmentation region is stored based on a stored content of the divided region storage circuit, the cell including: a register group to store a signal xi indicating the ignited state, a variable pi indicating whether or not self-ignition is possible, a variable ni for a self-ignition permission control signal, and a variable li indicating whether or not the cell is included in the divided region subjected to the image segmentation, the region distinguishing means including:

a decision circuit which calculates a sum Si of coupling weight Wik×xk between the adjacent cells, comparing the sum Si with a threshold value φZ, and deciding based on the comparison result whether or not the ignition is possible with respect to the respective cells;

a control circuit which executes the state transition with respect to the cells constituting decision objects based on the decision result of the decision circuit;

a boundary state detection circuit to decide three conditions from the states of the adjacent cells and the stored values of the register group of the cell:

Condition 1: the cell itself is already ignited;

Condition 2: the cell already belongs to a certain divided region; and

Condition 3: neither of Conditions 1 and 2 is satisfied and no adjacent cell is ignited; and to detect the cell which does not satisfy any condition as a cell in the vicinity of a boundary of region growth of image segmentation; and a mode switch circuit which sets the state transition of the control circuit into an active mode with respect to the cell detected by the boundary state detection circuit and which sets the state transition of the control circuit into a standby mode with respect to the other cells.

According to the present invention, there is provided to an image segmentation method in which a region belonging to the same category is specified from an input image by a pixel unit to identify an image segmentation region, the method comprising:

a block dividing step of dividing the input image into a plurality of blocks;

an initialization step including a step of bringing all a plurality of cells, which are disposed for each pixel of the divided block and which shift in non-ignited, self-ignitable, and ignited states, into the non-ignited state, a step of calculating a coupling weight of each of the plurality of cells with the adjacent cell based on a pixel value of the pixel corresponding to each of the plurality of cells, a step of determining one or more leader cells constituting candidates of self-ignitable cells from the plurality of cells based on a calculation result of the coupling weight, and a step of setting a global suppressor which is a variable to determine whether or not a cell being ignited exists in the plurality of cells to an initial value;

a first detection step of detecting the leader cell as the self-ignitable cell in order from the plurality of cells;

a self-ignition step of bringing the self-ignitable cell detected in the first detection step into the ignited state;

a second detection step of detecting an ignitable cell from the adjacent cells based on the coupling weight calculation result with the respective adjacent cells with respect to the cells in the ignited state including the leader cell;

an ignition step of bringing the cell detected in the second detection step into the ignited state; and an extinguishing step of bringing all the cells in the ignited state in an extinguished state in a case where the corresponding cell is not detected in the second detection step, the method including: a first processing routine of repeatedly performing the processing of the ignition step until the corresponding cell is not detected in the second detection step to complete the image segmentation of a region; a second processing routine of repeatedly performing a series of processing by the self-ignition step, the second detection step, the ignition step, and the extinguishing step until there is no leader cell in the non-ignited state in the first detection step to complete the image segmentation of all the regions; and a third processing routine of successively synthesizing processing results of the image segmentation region obtained for each divided block to obtain the whole image segmentation region.

According to the present invention, there is provided to an image segmentation apparatus in which a region belonging to the same category is specified from an input image by a pixel unit to identify an image segmentation region, and an image of an optional image segmentation region is selectively output, the apparatus comprising:

an input image memory in which each pixel value of the input image is stored;

a cell network comprising a plurality of cells which are disposed for each pixel of a block at a time when the input image is divided into a plurality of blocks having predetermined sizes and shapes and which shift in non-ignited, self-ignitable, and ignited states, and a plurality of coupling weight registers disposed between the adjacent cells in the plurality of cells to hold a coupling weight between the cells;

a coupling weight calculation circuit which reads each pixel value of the block designated as a processing object in the plurality of blocks in order from the input image memory to associate the values with the plurality of cells and which calculates the coupling weight between the adjacent cells based on the pixel value corresponding to each of the plurality of cells, the calculated coupling weight being held in the plurality of coupling weight registers;

a leader cell determination circuit to determine a cell whose sum of coupling weights with the adjacent cell exceeds a standard value as the leader cell based on the coupling weight calculated by the coupling weight calculation circuit;

region distinguishing means for repeatedly executing the processing including deciding from a held value of the coupling weight register disposed adjacent to each of the plurality of cells whether or not ignition is possible, shifting the leader cell determined by the leader cell determination circuit into the ignited state in order, and selecting the ignitable cell from the cells adjacent to the ignited leader cell to shift the ignitable cell into the ignited state, and distinguishing the image segmentation region of the selected block from the region of the cell brought into the ignited state;

a label control circuit which attaches and stores different labels to the respective pixels of the selected block for at least each adjacent region of the distinguished image segmentation region;

an auxiliary dividing control circuit which selects one of the plurality of blocks in order as the processing object to designate a range of the block and which interconnects image segmentation regions of the plurality of blocks successively distinguished by the region distinguishing means based on a label of each pixel attached by the label control circuit and which specifies the image segmentation region of the whole input image;

a divided region storage circuit to store information of all the cells in which the image segmentation region of the whole input image is specified by the auxiliary dividing control circuit; and an output image memory in which the pixel value corresponding to each cell of an optional image segmentation region is stored based on a stored content of the divided region storage circuit.

According to the present invention, there is provided to an integrated circuit comprising all circuits integrated for image segmentation in which a region belonging to the same category is specified from an input image by a pixel unit to identify an image segmentation region, and an image of an optional image segmentation region is selectively output, the circuit comprising:

an input image memory in which each pixel value of the input image is stored;

a cell network including a plurality of cells which are disposed for each pixel of the input image and which shift in non-ignited, self-ignitable, and ignited states, and a plurality of coupling weight registers disposed between the adjacent cells in the plurality of cells to hold a coupling weight between the cells;

a coupling weight calculation circuit which calculates the coupling weight between the adjacent cells based on the pixel value corresponding to each of the plurality of cells, the calculated coupling weight being held in the plurality of coupling weight registers;

a leader cell determination circuit to determine a cell whose sum of coupling weights with the adjacent cell exceeds a standard value as the leader cell based on the coupling weight calculated by the coupling weight calculation circuit;

region distinguishing means for repeatedly executing the processing including deciding from a held value of the coupling weight register disposed adjacent to each of the plurality of cells whether or not ignition is possible, shifting the leader cell determined by the leader cell determination circuit into the ignited state in order, and selecting the ignitable cell from the adjacent cells to shift the ignitable cell into the ignited state, and distinguishing the image segmentation region from the region of the cell brought into the ignited state;

a divided region storage circuit to store information of all the cells in which the image segmentation region is distinguished; and an output image memory in which the pixel value corresponding to each cell of an optional image segmentation region is stored based on a stored content of the divided region storage circuit, the cell including: a register group to store a signal $x_i$ indicating the ignited state, a variable $p_i$ indicating whether or not self-ignition is possible, a variable ni for a self-ignition permission control signal, and a variable li indicating whether or not the cell is included in the divided region subjected to the image segmentation, the region distinguishing means including:

a decision circuit which calculates a sum Si of coupling weight Wik×xk between the adjacent cells, comparing the sum Si with a threshold value φZ, and deciding based on the comparison result whether or not the ignition is possible with respect to the respective cells;

a control circuit which executes the state transition with respect to the cells constituting decision objects based on the decision result of the decision circuit;

a boundary state detection circuit to decide three conditions from the states of the adjacent cells and the stored values of the register group of the cell:

Condition 1: the cell itself is already ignited;

Condition 2: the cell already belongs to a certain divided region; and

Condition 3: neither of Conditions 1 and 2 is satisfied and no adjacent cell is ignited; and to detect the cell which does not satisfy any condition as a cell in the vicinity of a boundary of region growth of image segmentation; and a mode switch circuit which sets the state transition of the control circuit into an active mode with respect to the cell detected by the boundary state detection circuit and which sets the state transition of the control circuit into a standby mode with respect to the other cells.

According to the present invention, there is provided to an integrated circuit comprising all circuits integrated for image segmentation in which a region belonging to the same category is specified from an input image by a pixel unit to identify an image segmentation region, and an image of an optional image segmentation region is selectively output, the circuit comprising:

an input image memory in which each pixel value of the input image is stored;

a cell network comprising a plurality of cells which are disposed for each pixel of a block at a time when the input image is divided into a plurality of blocks having predetermined sizes and shapes and which shift in non-ignited, self-ignitable, and ignited states, and a plurality of coupling weight registers disposed between the adjacent cells in the plurality of cells to hold a coupling weight between the cells;

a coupling weight calculation circuit which reads each pixel value of the block designated as a processing object in the plurality of blocks in order from the input image memory to associate the values with the plurality of cells and which calculates the coupling weight between the adjacent cells based on the corresponding pixel value, the calculated coupling weight being held in the plurality of coupling weight registers;

a leader cell determination circuit to determine a cell whose sum of coupling weights with the adjacent cell exceeds a standard value as the leader cell based on the coupling weight calculated by the coupling weight calculation circuit;

region distinguishing means for repeatedly executing the processing including deciding from a held value of the coupling weight register disposed adjacent to each of the plurality of cells whether or not ignition is possible, shifting the leader cell determined by the leader cell determination circuit into the ignited state in order, and selecting the ignitable cell from the cells adjacent to the ignited leader cell to shift the ignitable cell into the ignited state, and distinguishing the image segmentation region of the selected block from the region of the cell brought into the ignited state;

a label control circuit which attaches and stores different labels to the respective pixels of the selected block for at least each adjacent region of the distinguished image segmentation region;

an auxiliary dividing control circuit which selects one of the plurality of blocks in order as the processing object to designate a range of the block and which interconnects image segmentation regions of the plurality of blocks successively distinguished by the region distinguishing means based on a label of each pixel attached by the label control circuit and which specifies the image segmentation region of the whole input image;

a divided region storage circuit to store information of all the cells in which the image segmentation region of the whole input image is specified by the auxiliary dividing control circuit; and an output image memory in which the pixel value corresponding to each cell of an optional image segmentation region is stored based on a stored content of the divided region storage circuit.

In an image segmentation apparatus and image segmentation integrated circuit according to the present invention, the above-described methods are realized by hardware. In an architecture proposed in the present invention, the present inventors have newly introduced systems such as the boundary active only (BAO) scheme and subdivided image approach (SIA) into a real-time image segmentation architecture of a cell network base proposed in Documents 4 to 6 and 10, and have further combined the architecture with a low power consumption technique in another circuit level. Accordingly, it is possible to realize reduction of the power consumption by about 75% as compared with the conventional technique without losing a real-time processing property. By the use of SIA, it is possible to process a large-scaled image having a VGA size with low power consumption in real time. These technique are capable of realizing the present invention by not only the most advanced CMOS technology but also inexpensively established 0.35 μm CMOS technology, and application of the present invention to a battery-driven small-sized robot or portable application can be expected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 22 is a block diagram showing a constitution of an image segmentation apparatus using the SIA;

FIG. 24 is a block diagram showing a constitution of a portion which processes a pre-labeled cell in the constitution of FIG. 23;

FIG. 25 is a block diagram showing a concrete constitution of an image segmentation cell $C_i$ of FIG. 23;

FIG. 26 is a block diagram showing another constitution of the image segmentation cell $C_i$ of FIG. 23;

FIG. 28 is a block diagram showing a concrete constitution of a label control circuit shown in FIG. 22;

FIG. 29 is a block diagram showing a concrete constitution of an SIA control circuit shown in FIG. 22;

DETAILED DESCRIPTION OF THE INVENTION

Figure 1:
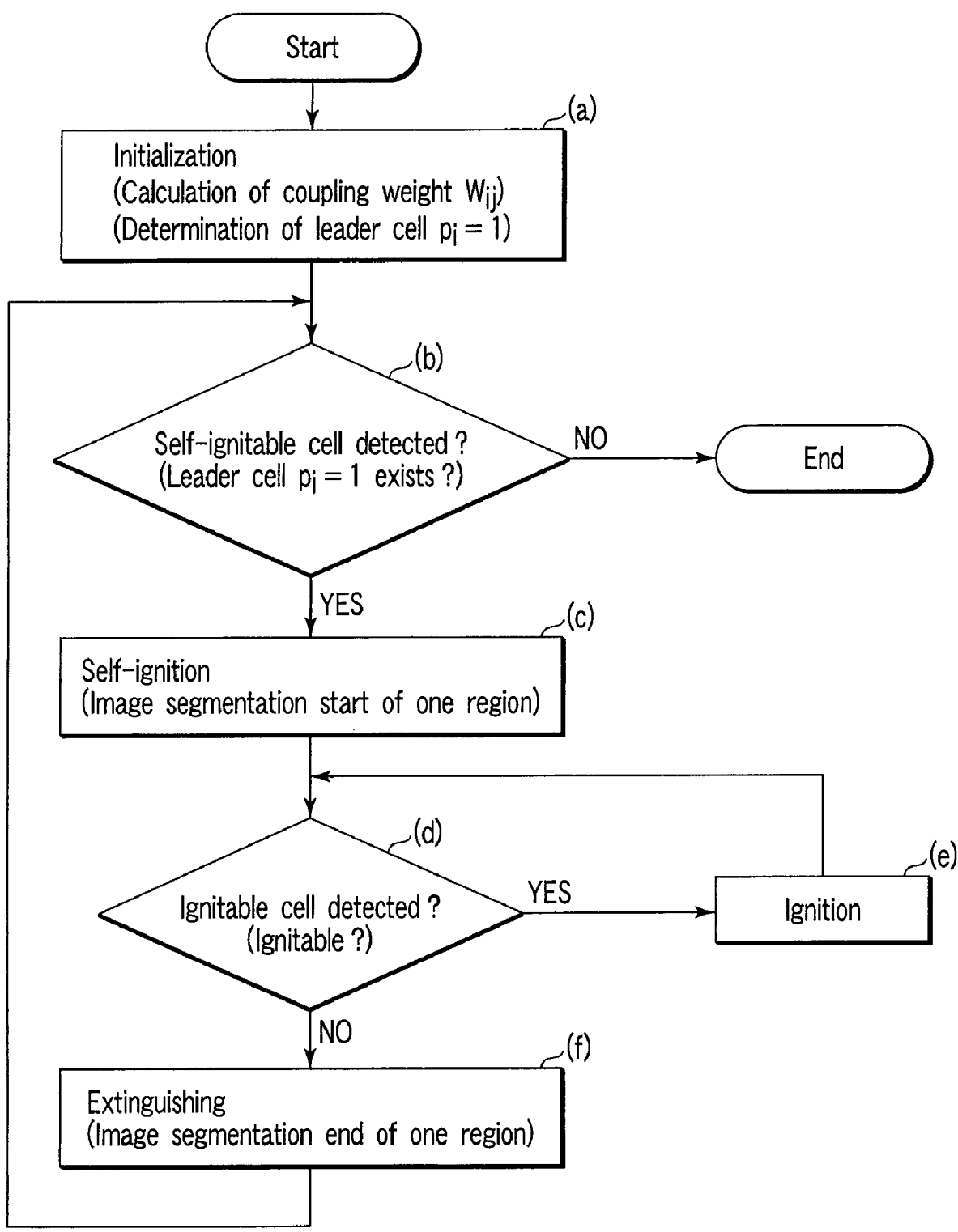
FIG. 1 is a flowchart showing a flow of an image segmentation algorithm processing for use in the present invention.

An embodiment of the present invention will be described hereinafter in detail with reference to the drawing.

[Description and Constitution of Method]

(Basic Architecture and Trial Result)

A proposed image segmentation architecture is based on an image segmentation algorithm/architecture which have been heretofore proposed by the present inventors [see Documents 4 to 6, 10, for example]. In estimates by simulations which have been heretofore performed, high-speed processing of a VGA size image (640×480 pixels) at about 500 μsec at 10 MHz or less can be expected.

First, the image segmentation algorithm for use in the present invention will be described.

FIG. 1 is a flowchart showing a flow of processing of the image segmentation algorithm for use in the present invention. The algorithm shown in FIG. 1 comprises six processes: (a) initialization; (b) self-ignitable cell detection; (c) self-ignition; (d) ignitable cell detection; (e) ignition; and (f) extinguishment.

In this algorithm, cells corresponding to pixels operate in parallel based on a coupling weight among eight pixels adjacent to one another. Here, the cell corresponding to each pixel takes a non-ignited, self-ignitable, or ignited state. A variable $x_i$ indicates the ignited or non-ignited state of the cell, $x_i=1$ indicates the ignited state, and $x_i=0$ indicates the non-ignited state. A variable $p_i$ indicates a leader cell. When $p_i=1$, self-ignition is possible, and the cell is a candidate of self-ignition. A variable $l_i$ indicates whether or not the cell is included in a divided region subjected to the image segmentation. When $l_i=1$, it is meant that the cell belongs to the already divided region. In the image segmentation algorithm for use in the present invention, it is decided by the ignited or non-ignited state whether or not the cell belongs to the same image segmentation region.

In FIG. 1, in the "(a) initialization", the variable $x_i$ indicating the ignited/non-ignited state of the cell i is initialized into $x_i=0$ (non-ignited). Moreover, a coupling weight $W_{ik}$ based on the pixel value of a cell (pixel) $k \in N(i)$ adjacent to the cell (pixel) i is calculated. Here, N(i) indicates a set of cells adjacent to the cell i (e.g., a set of eight adjacent cells).

Next, it is determined based on the coupling weight between the cells whether or not the cell is self-ignitable (leader cell). If the sum $\Sigma k \in N(i) W_{ik}$ of the coupling weights of the adjacent cells is larger than a threshold value $\phi p$ designated beforehand, the cell is self-ignitable, and the variable $p_i$ indicating whether or not the cell is self-ignitable (leader cell) is initialized into $p_i=1$ (self-ignitable), $p_i=0$ (self-ignition is impossible). The leader cell is a candidate of a start point to start the processing in the subsequent image segmentation. Finally, a variable z (referred to as the global suppressor) for determining whether or not the cell being ignited exists is initialized into $z=0$. When $z=1$, it is indicated that the cell being ignited exists, that is, that the image segmentation of one region continues. When $z=0$, it is indicated that the cell being ignited does not exist, that is, that the image segmentation of one region ends. A variable zi is prepared for each cell i. When the non-ignited state shifts to the ignited state, zi=1 is set. In other cases, zi=0. The value of a global suppressor z is defined as the logical sum (OR) of all zi based on this variable zi.

In "(b) self-ignitable cell detection", a self-ignitable cell is selected from the leader cells which are not ignited yet.

In "(c) self-ignition", the selected leader cell is set to the ignited state xi=1 (self-ignition) to start the image segmentation of one region. At this time, z=1 is set.

In "(d) ignitable cell detection", the state of the adjacent cell k∈N(i) is checked with respect to the cell i in the non-ignited state to calculate the sum Si=Σk∈N(i) Wik×xk of the coupling weights of the cells in the ignited state. If the cell k∈N(i) is ignited, that is, xk=1, the coupling weight between the cell and the adjacent ignited cell k is added to Si. When the sum Si of the coupling weights is larger than the pre-designated threshold value φZ (Si>φZ), it is decided that the cell i is the ignitable cell.

In "(e) ignition", all the ignitable cells i detected in "(d) ignitable cell detection" are set to the ignited state xi=1, and zi=1 is also set. If any ignitable cell does not exist, "(f) extinguishing" is performed.

In "(f) extinguishing", xi=0 is set with respect to the cell i in the ignited state. When pi=1, pi=0 is set. Moreover, the process shifts to "(b) self-ignitable cell detection".

A description example of the image segmentation algorithm will be described below. All the cells execute the following algorithm in parallel. It is to be noted that with a function find_leader( ) in the algorithm, the leader cell not ignited yet is searched, and the cell number is returned. When the corresponding cell does not exist, a negative number is returned. It is also assumed that the respective variables xi, zi, z change with time, and the values of xi in time t, t+1 are represented by xi(t), xi(t+1).

[Image Segmentation Algorithm]

1. Initialization
   1. initialization of global suppressor z(0)=0;
   2. calculation of coupling weight among eight adjacent cells;
   3. determination of leader cell if (Σk∈N(i) Wik>φp) then pi=1; other wise pi=0; and
   4. all the cells are non-ignited. xi(0)=0, li=0.

2. Self-Ignition
   If (the ignitable cell does not exist) then stop; //end
   else if (find_leader( )==i∧pi==1) then
   xi(t+1)=1, z(t+1)=1; go to (3. ignition)//self-ignition
   else go to (2. self-ignition).

3. Ignition
   Setting of global suppressor, logical sum of z(t)= v∀izi(t);//zi
   if (z(t)==0), then//case where there is not any cell being ignited,
   if (xi(t)==1) then
   xi(t+1)=0; zi(t+1)=0; pi=0; li=1; //extinguishing
   go to (2. self-ignition);
   else if (xi(t)==0∧zi(t)==0) then//non-ignition
   Si(t)=Σk∈N(i) (Wik×xk(t));
   if (Si(t)>φZ) then xi(t+1)=1; zi(t+1)=1; //ignition
   else xi(t+1)=0; zi(t+1)=0;
   else if (xi(t)==1∧zi(t)==1) then xi(t+1)=1; zi(t+1)=0;
   go to (3. ignition).

Figure 2:
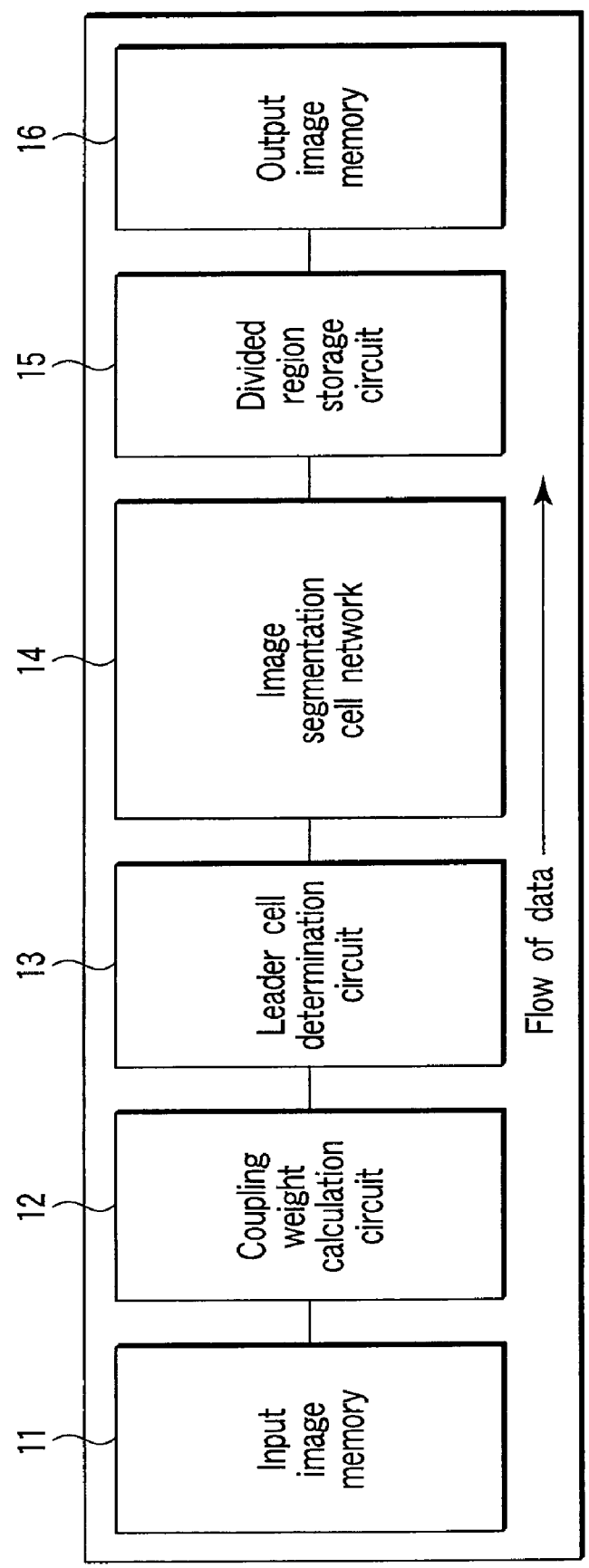
FIG. 2 is a block diagram showing a hardware constitution of an image segmentation apparatus based on the algorithm shown in FIG. 1.

The proposed architecture is based on the image segmentation algorithm on the basis of the above-described cell network, and the hardware of the image segmentation apparatus based on this algorithm comprises four pipeline stages as shown in FIG. 2.

In FIG. 2, input image data is successively recorded in an input image memory 11. In a coupling weight calculation circuit 12 of a first stage, image data of a processing object is taken from the input image memory 11, and the coupling weight is calculated based on a difference of luminance between the adjacent pixels (difference of luminance of RGB in a color image). In a leader cell determination circuit 13 of a second stage, the leader cell constituting a start point of region growth of image segmentation is determined based on the calculated coupling weight. Next, in an image segmentation cell network 14 which is a core circuit of image segmentation, the image segmentation is performed with respect to a plurality of pixels in parallel by the coupling weight and information of the leader cell.

Figure 3:
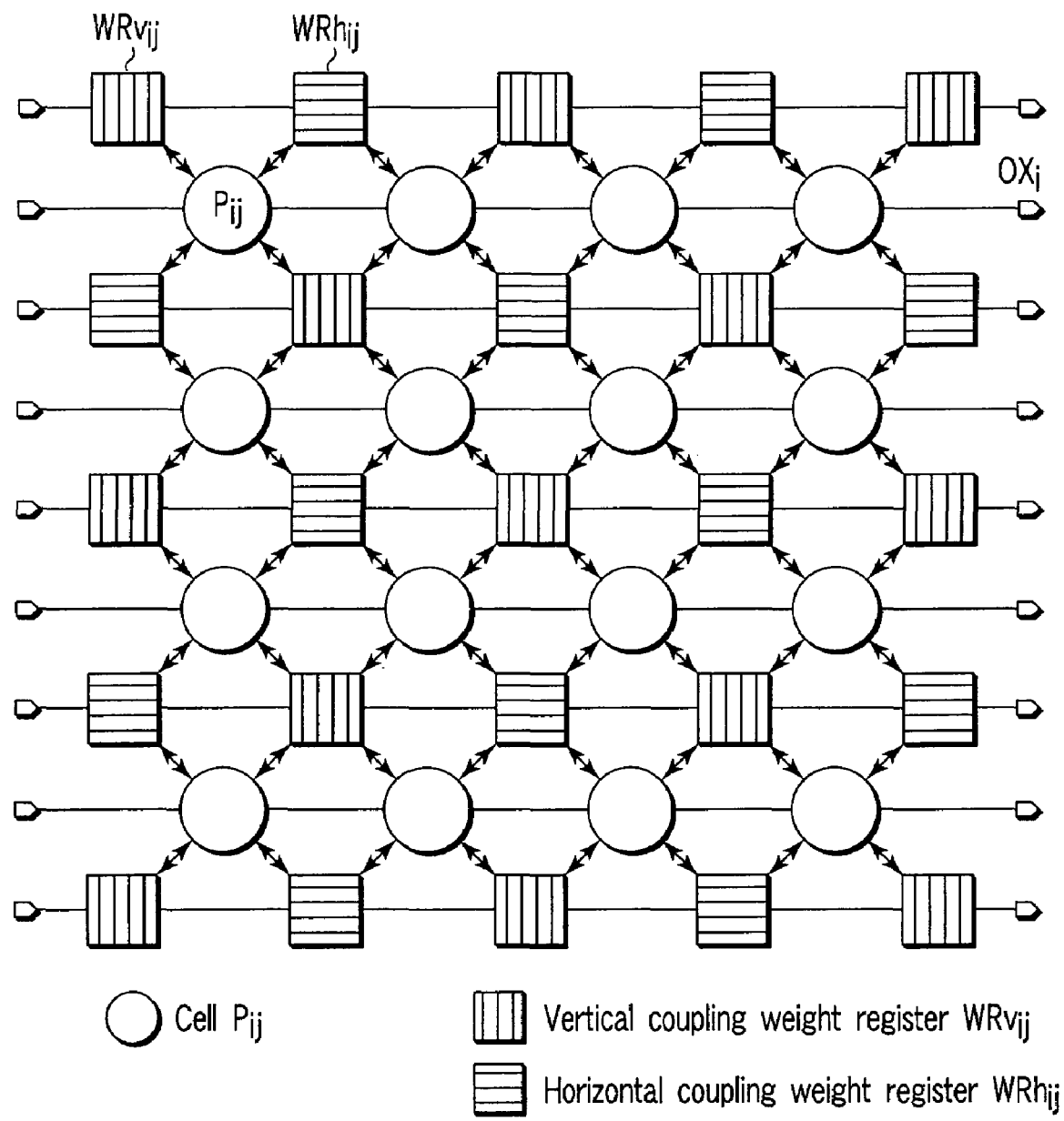
FIG. 3 is a block diagram showing a schematic constitution of an image segmentation cell network shown in FIG. 2.

Here, as shown in FIG. 3, the image segmentation cell network 14 has a cell network structure in which one pixel is associated with one cell Pij, and vertical and horizontal coupling weight registers WRvji, WRhij are alternately arranged between the cells in an array form to realize a small area. Each cell shifts to the ignited, self-ignited, and extinguished states in parallel based on the state of the adjacent cell and the coupling weight. In the proposed architecture, one of a plurality of leader cells is self-ignited, it is successively decided based on the coupling weight of the adjacent cell whether or not the cell is ignitable. If conditions are satisfied, the cell is ignited. This ignition is performed as if the region expanded from the leader cell. A global suppressor circuit detects that there is not any ignitable cell. By this detection, it is decided that the image segmentation of one region is completed, and the extinguishing is performed with respect to the ignited cell. The above-described processing is repeated until all the leader cells are ignited, and accordingly the image segmentation of all the regions is completed.

Finally, in a divided region storage circuit 15 of a fourth stage, a label number of each divided region subjected to the image segmentation in the image segmentation cell network 14, and the number is recorded in an image memory 16 together with processed image data.

Figure 4:
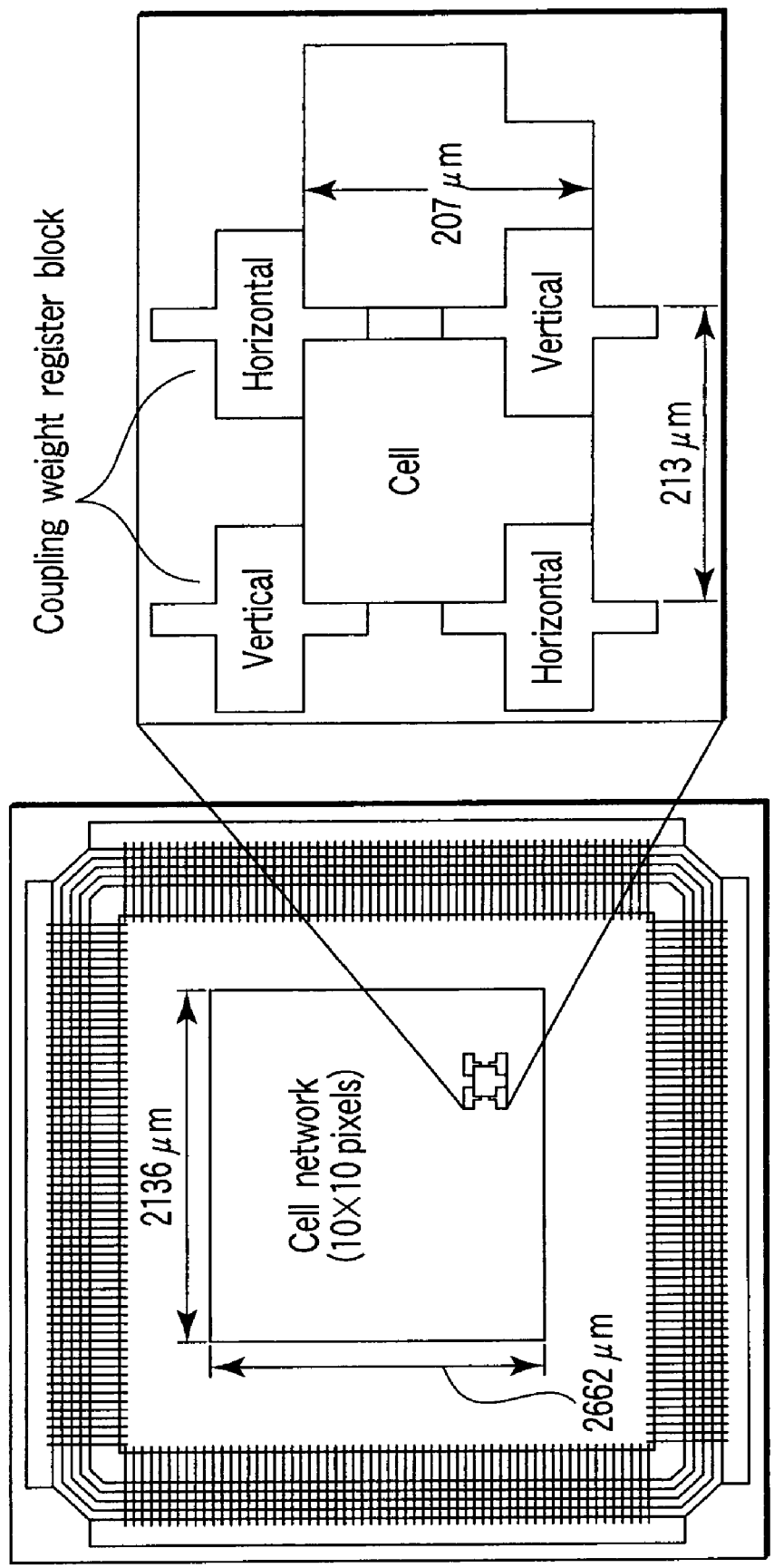
FIG. 4 is a diagram showing a structure of a test chip of the image segmentation cell network shown in FIG. 3.

The present inventors designed/fabricated a test chip of the image segmentation cell network 14 which is the above-described core circuit using a 0.35 μm CMOS technology. A chip picture and a partial enlarged view are shown in FIG. 4. To realize the small area, all active cells and coupling weight register blocks were designed by full custom.

Figure 5B:
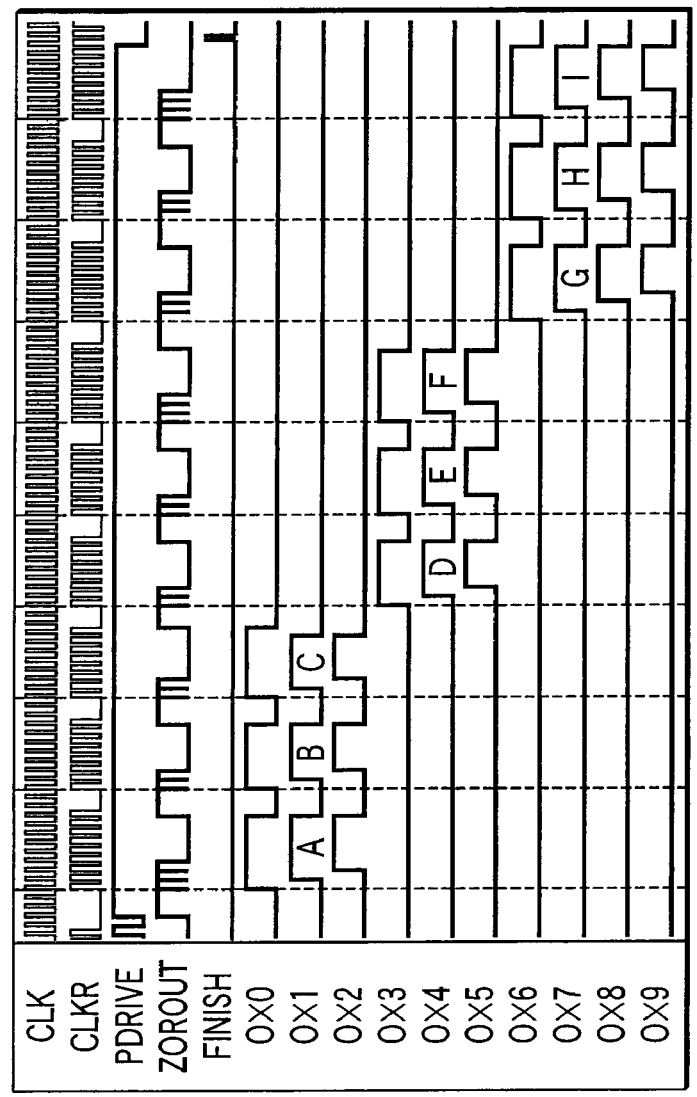
FIGS. 5A and 5B are explanatory views of a result of image segmentation measurement with respect to a checkerboard image in the test chip shown in FIG. 4.
Figure 5A:
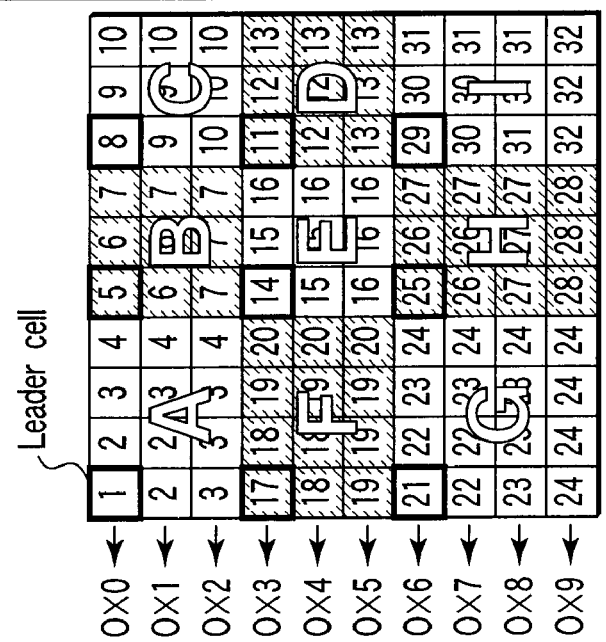

In actual, an image segmentation waveform of a checker-board image shown in FIG. 5A was measured with respect to the chip of manufactured image segmentation LSI. Accordingly, a measurement result was obtained as shown in FIG. 5B. Even when a plurality of divided regions were subjected to the image segmentation, it was possible to confirm correct behavior. Table 1 shows items of the prepared image segmentation LSI chip according to a conventional art.

TABLE 1

| Designed Image Segmentation LSI Item (Measurement Result) | |
|---|---|
| Architecture | Weight parallel architecture (10 × 10 pixels) |
| Technology | 0.35 μm, 2-poly, 3-metal CMOS |
| Power supply voltage | 3.3 V |
| Measured maximum clock frequency | 25 MHz |
| Measured average power consumption | 24.4 mW at 10 MHz |
| Number of transistors | 249,810 |
| Pixel density | 19.6 pixels/mm2 |

Here, as shown in Table 1, in the fabricated chip, the image segmentation of 10×10 (=100) pixels can be performed, but an average power consumption was about 24.4 mW at 10 MHz at that time. From this result, when a large image of 100×100 (=10,000) or more pixels is subjected to the image segmentation, the power consumption exceeds 1 watt. When the power consumption is large in this manner, it is difficult to apply the cell as such to a robot vision, battery driving for mobile application or the like. The power consumption needs to be further reduced for the application.

[Reduction Method of Power Consumption by Boundary Active Only (BAO) Scheme]

Figure 6:
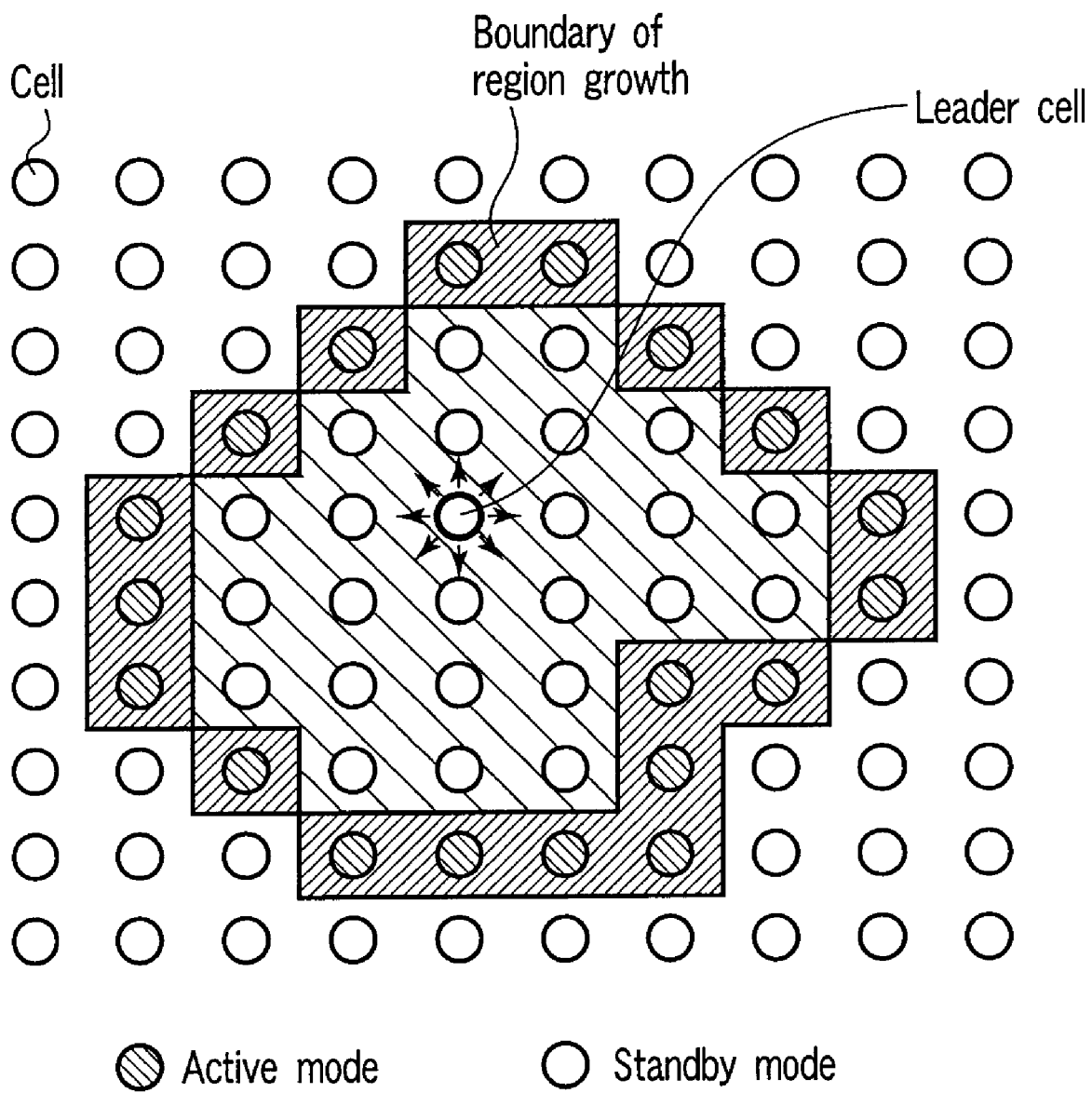
FIG. 6 is a concept diagram showing a boundary active only (BAO) scheme proposed by the present invention.

To solve the problem, with respect to the above-described algorithm/architecture, in the present invention, there is proposed a new boundary active only (BAO) scheme for reducing the power consumption without deteriorating a real-time processing performance even in the processing of a large image. FIG. 6 shows a schematic diagram of the BAO scheme proposed by the present invention. In this method, only the cell in the vicinity of a boundary of region growth is set to an active mode, and the other cells are set to a standby mode. The image segmentation algorithm of the present invention being of a region growth type is effectively used.

As described above in the algorithm, the respective cells operate in parallel, and the sum of coupling weights is calculated in accordance with the state of the adjacent cell. When the sum is not less than the threshold value $\phi Z$, the cell shifts to the ignited state. Therefore, when the number of cells (number of pixels) increases, the number of cells operating simultaneously increases, and the power consumption increases in general.

Here, in the above-described algorithm, as shown in FIG. 6, each cell performs state transition in parallel. Additionally, in actual, the state transition of the cell is performed in a case where "as a result of calculation of the sum of the coupling weights, the sum is not less than the threshold value $\phi Z$" and the cell constitutes the boundary of the region growth of the ignited cell from the leader cell as the start point (boundary of the region growth of FIG. 6). In another case, since the sum of the coupling weights does not change, the state of the cell does not change.

When this is noted, and when any of the following conditions is satisfied, it is not necessary to decide whether or not the state transition for each clock cycle is performed, that is, it is not necessary "to calculate the sum of the coupling weights and to decide whether or not the sum is not less than the threshold value $\phi Z$".

1. The cell itself is already ignited ($x_i = 1$)
2. The layer already belongs to a certain divided region.
3. Either of the above 1, 2 is not satisfied, and any of the adjacent cells is not ignited ($x_j = 0$, $j \in N(i)$).

The algorithm into which the above-described conditions are taken will be described below.

[Image Segmentation Algorithm into which BAO is Introduced]

1. Initialization
   1. initialization of global suppressor $z(0)=0$;
   2. calculation of coupling weight among eight adjacent cells;
   3. determination of leader cell if ($\Sigma k \in N(i)$ Wik$>\phi p$) then pi=1; other wise pi=0; and
   4. all the cells are non-ignited. $x_i(0)=0$, $l_i=0$.

2. Self-Ignition
   If (the ignitable cell does not exist) then stop; //end
   else if (find_leader( )==i$\wedge$pi==1) then
   $x_i(t+1)=1$, $z(t+1)=1$; go to (3. ignition)//self-ignition
   else go to (2. self-ignition).

3. Ignition
   If (li==1) then//already included in divided region in previous phase,
   go to (4. standby mode);
   Setting of global suppressor, $z(t)=v\forall izi(t)$; //logical sum of zi
   if (z(t)==0), then//case where there is not any cell being ignited,
   if (xi(t)==1) then
   xi(t+1)=0; zi(t+1)=0; pi=0; li=1; //extinguishment
   go to (2. self-ignition);
   else//z(t)=1, that is, case where there is a cell being ignited,
   if (xi(t)==1) then
   go to (4. standby mode);
   else
   if ($\forall$xk(t)==0, xk(t)$\in$N(i)) then//adjacent cell is not ignited
   go to (4. standby mode)
   else
   if (xi(t)==0$\wedge$zi(t)==0) then //non-ignition
   Si(t)=$\Sigma k \in N(i)$ (Wik×xk(t));
   if (Si(t)>$\phi$Z) then xi(t+1)=1; zi(t+1)=1; //ignition
   else xi(t+1)=0; zi(t+1)=0;
   else if (xi(t)==1$\wedge$zi(t)==1) then xi(t+1)=1; zi(t+1)=0;
   go to (3. ignition).

4. Standby Mode
   If (li==1 or xi(t)==1) then
   go to (4. standby mode);
   if ($\exists$xk(t)==1, xk(t)$\in$N(i)) then//one of adjacent cells is ignited
   go to (3. ignition).

The BAO scheme in the present invention is a method of automatically controlling the simultaneously operating cells and coupling weight registers so as to decrease the numbers of the cells and registers so that the power consumption is reduced, paying attention to the above-described respects.

Figure 7A:
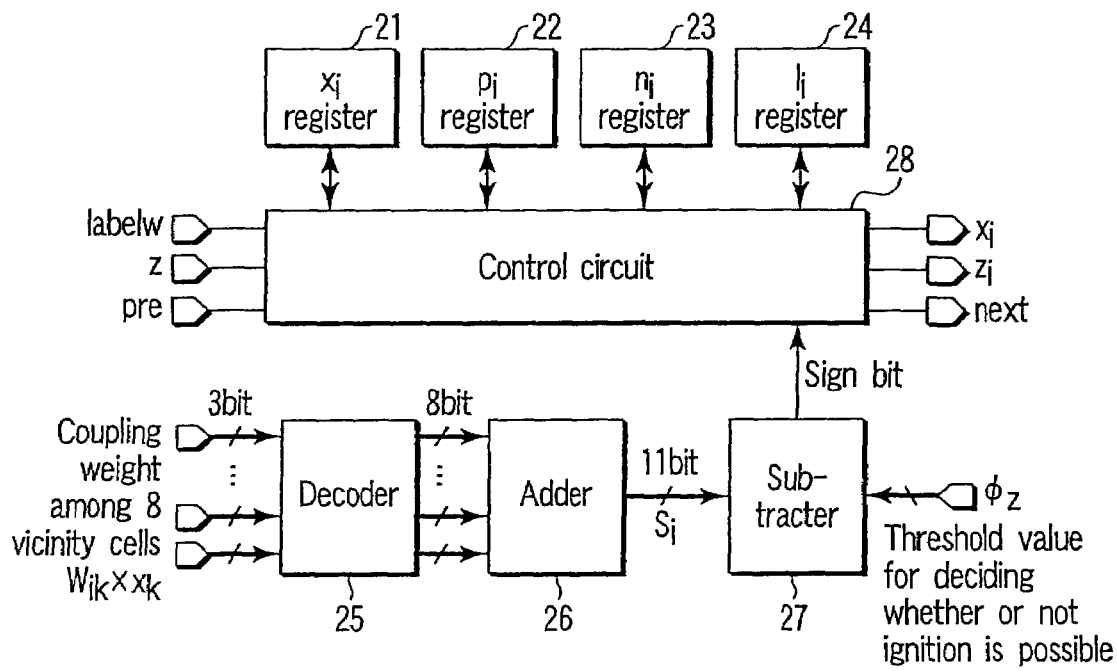
FIGS. 7A and 7B are block diagrams showing a circuit constitution of the cell according to conventional methods.
Figure 7B:
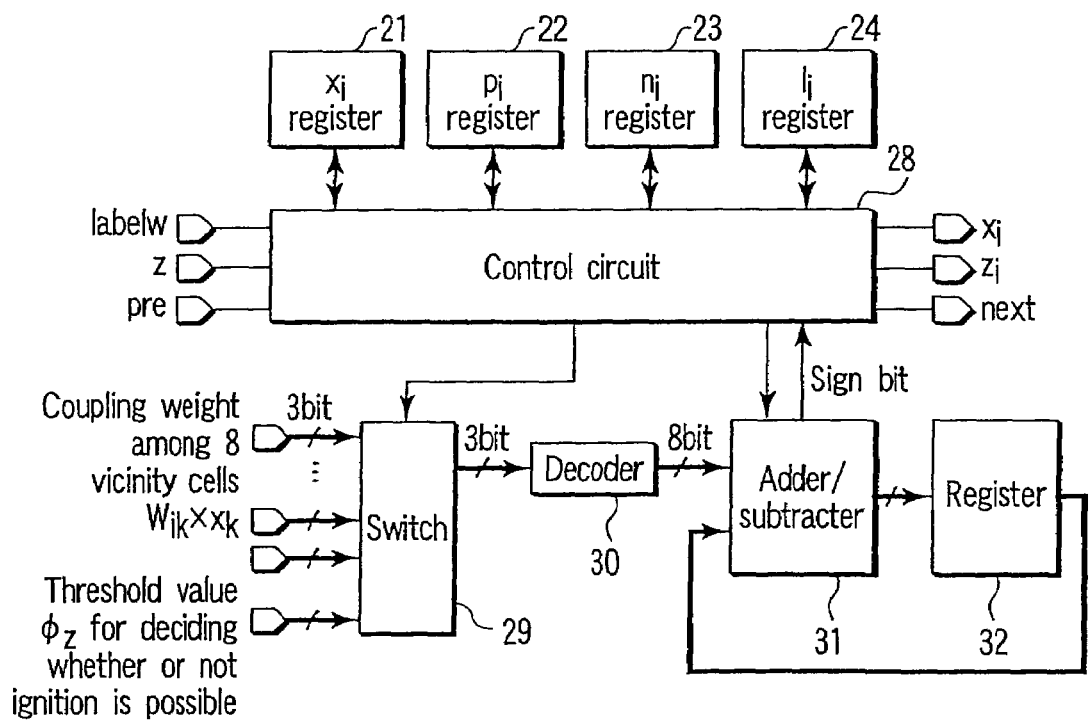
Figure 8:
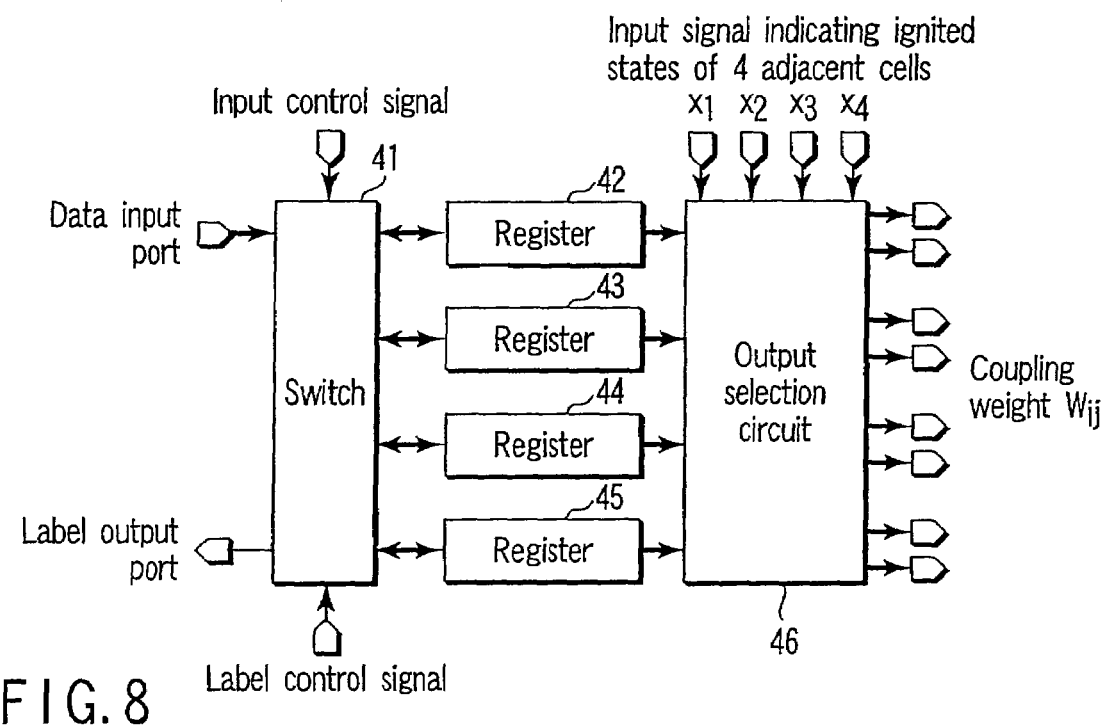
FIG. 8 is a block diagram showing a circuit constitution of a coupling weight register by the conventional method.

FIGS. 7A and 7B are block diagrams showing a circuit constitution of the cell according to conventional methods, and FIG. 8 is a block diagram showing a circuit constitution of a coupling weight register by the conventional method. It should be noted that FIG. 7A shows a constitution of a high-speed operation of the cell, in which the coupling weights with eight adjacent cells are calculated in parallel in one cycle (weight parallel architecture). FIG. 7B shows a constitution of a high-speed operation of the cell, in which the coupling weights with eight adjacent cells are successively calculated in nine cycles (weight serial architecture).

In the cell shown in FIG. 7A, a signal xi (1 bit) indicating the ignited state to registers 21 to 24, a variable pi (1 bit) indicating whether or not the self-ignition is possible, a variable ni for a self-ignition permission control signal (1 bit), and a variable li (1 bit) indicating whether or not the cell is included in a certain divided region subjected to the image segmentation are stored. A coupling weight Wik×xk among eight adjacent cells each encoded in three bits is input, and a decoder 25 decodes the weight in eight bits. Thereafter, an adder 26 calculates a sum Si of the coupling weights, and a subtracter 27 subtracts a threshold value $\phi Z$ for deciding "whether or not the ignition is possible" from the sum Si (11 bits). The subtracter 27 decides Si−$\phi Z$>0 to output a sign bit indicating a decision result to a control circuit 28.

On the other hand, in the image segmentation cell Pi in the constitution shown in FIG. 7A, the coupling weight Wik×xk among eight vicinity cells each encoded in three bits and the threshold value $\phi Z$ for deciding an "ignitable" state are successively selectively input by input switch of a switch 29. Moreover, a selection result is decoded into eight bits by a decoder 30, and addition/subtraction is successively performed by a serial adder/subtracter 31 and register 32.

That is, since the addition/subtraction is performed in parallel in the constitution shown in FIG. 7A, acceleration can be realized. However, since eight adders and subtracters are required, the area of the whole cell increases. On the other hand, since one adder/subtracter is used in the constitution shown in FIG. 7B, the area of the cell is reduced. However, time required for the addition/subtraction increases to nine cycles from one cycle, and the whole processing time is longer than a parallel addition/subtraction time. In this manner, the constitutions of FIGS. 7A and 7B have a mutual trade-off relation. Therefore, the constitution is selectively used in accordance with an application depending on whether high speed or small area is regarded as important.

On the other hand, there are two types including vertical and horizontal coupling types in a coupling weight register by a conventional method shown in FIG. 8. Either type has the same basic inner structure. The vertical coupling type in a case where a coupling weight value held in the register includes a coupling weight between the cells in a vertical direction is distinguished from the horizontal coupling type in a case where the value includes a coupling weight between the cells in a horizontal direction.

As shown in FIG. 8, the coupling weight register comprises: a switch 41 for switching/outputting the coupling weight value input via a data input port in four systems based on an input control signal; four registers 42 to 45 in which the coupling weight values given from the switch 41 are stored; and an output selection circuit 46 for transferring the coupling weight value to the adjacent image segmentation cell.

Here, the value of the coupling weight is in the range of 0 to 255 in a case where a pixel value is represented by eight bits. Therefore, in general, the coupling weight register requires eight bits. However, since the number of coupling weight registers is proportional to that of the pixels, the number of bits have a large influence on an area increase. To solve the problem, the coupling weight value of eight bits is encoded into three bits, and stored in the registers 42 to 45. Accordingly, the area of each coupling weight register and a bit width of a wiring required for exchanging data between each coupling weight register and the image segmentation cell can be largely reduced, and the small area can be realized.

The output selection circuit 46 selectively outputs any of four coupling weight values stored in the registers 42 to 45 based on a signal xi (ignited state xi=1, non-ignited state xi=0) indicating the ignited state of four neighboring cells Pi (i is any of 1 to 4).

A constitution in a case where the BAO scheme of the present invention is applied to the cell and coupling weight register constituted as described above is shown in FIGS. 9 and 10. It should be noted that in FIGS. 9 and 10, the same parts as those of FIGS. 7A, 7B, and 8 are denoted with the same reference numerals, and redundant description is omitted.

Figure 9:
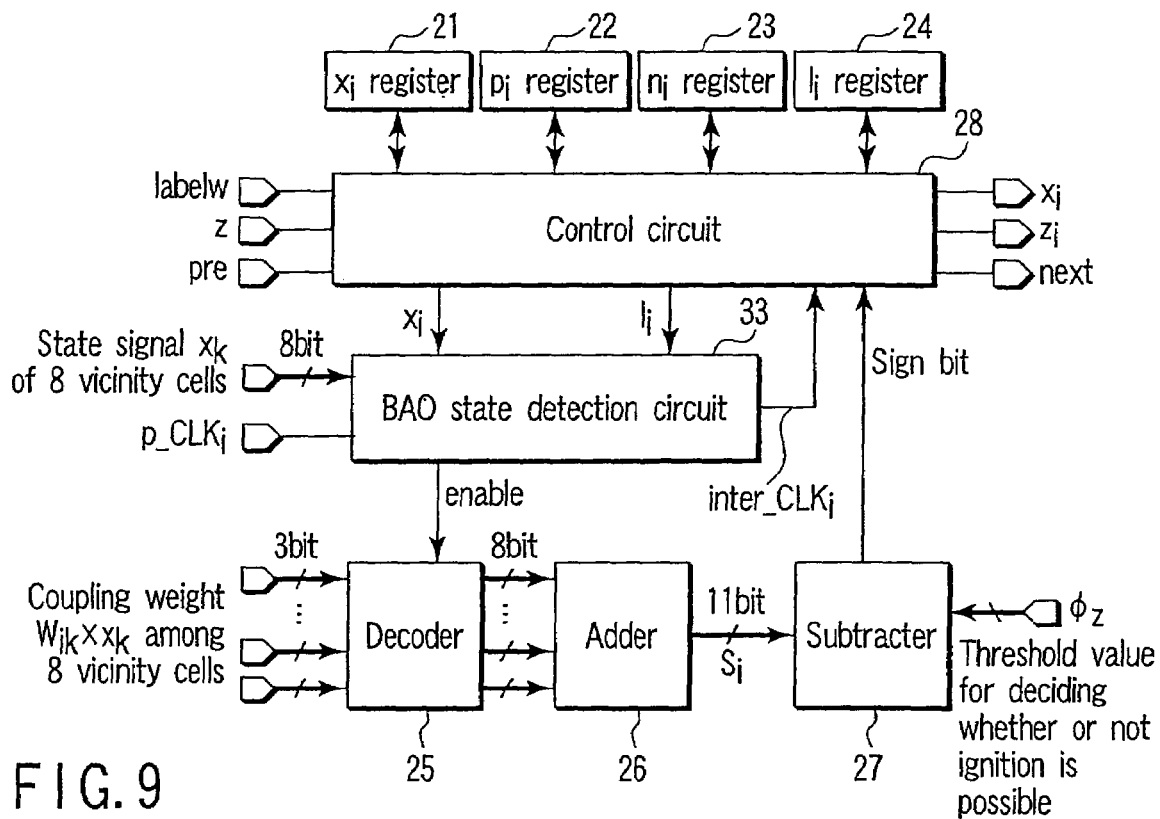
FIG. 9 is a block diagram in a case where a BAO state detection circuit according to the present invention is added to the cell of a weight parallel architecture shown in FIG. 7A.
Figure 10:
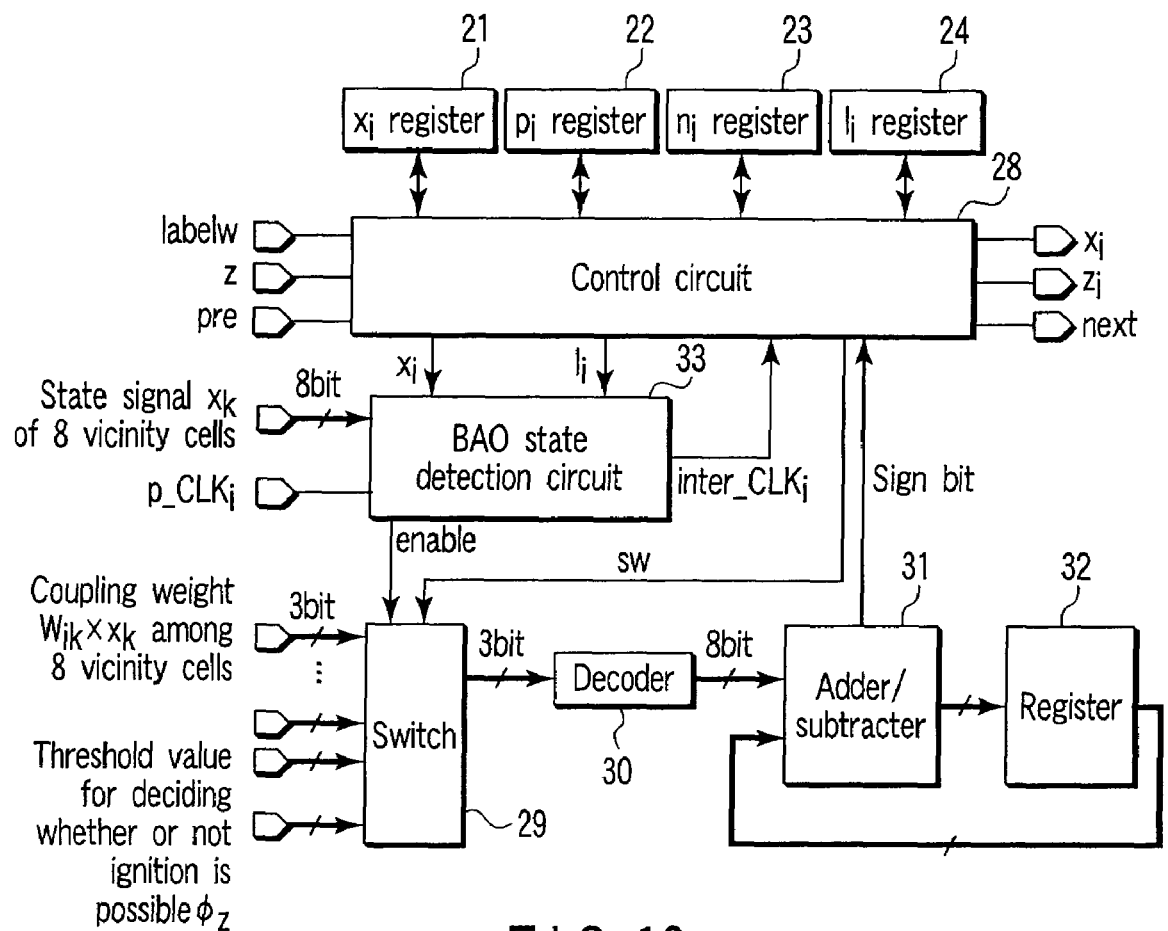
FIG. 10 is a block diagram in a case where the BAO state detection circuit according to the present invention is added to the cell of a weight serial architecture shown in FIG. 7B.

FIG. 9 is a circuit block diagram in a case where a BAO state detection circuit 33 according to the present invention is added to the cell of the weight parallel architecture shown in FIG. 7A. FIG. 10 is a circuit block diagram in a case where the BAO state detection circuit 33 according to the present invention is added to the cell of the weight serial architecture shown in FIG. 7B.

A clock p_CLKi is supplied as an internal clock inter_CLKi to the respective registers 21 to 24 through the BAO state detection circuit 33. The value from the adjacent coupling weight register is controlled by setting an enable signal to the decoder 25 in the weight parallel architecture of FIG. 9 and to the decoder 30 in the weight serial architecture of FIG. 10. In FIGS. 9, 10, the decoder 25, adder 26, and subtracter 27 constitutes a combined circuit. When the input does not change, charge/discharge hardly occurs in a transistor in each circuit, and therefore no power is consumed. In FIG. 9, the value input into the decoder 25 is fixed. Also in FIG. 10, the input of the switch 29 is set to a fixed value. Accordingly, the condition that the input does not change is satisfied. Therefore, it is possible to reduce the power consumption.

Figure 11:
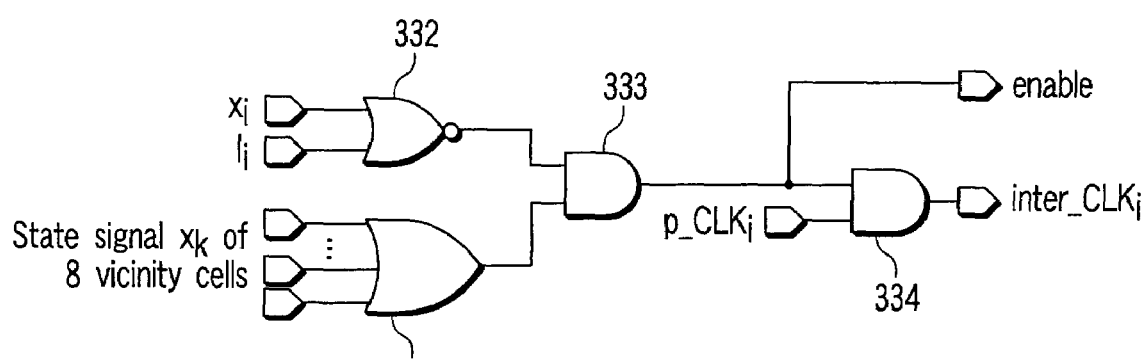
FIG. 11 is a block diagram showing a constitution example of the BAO state detection circuit shown in FIGS. 9 and 10.

FIG. 11 shows a constitution example of the BAO state detection circuit 33. In FIG. 11, a first logical sum gate 331 decides Condition 1 by the logical sum of the state signals xk of eight adjacent vicinity cells. A second logical sum gate 332 takes in a signal xi, and variable li from the control circuit 28 to obtain the logical sum, and decides Condition 2. A first logical product gate 333 takes a logical product of outputs of the first logical sum gate 331 and second logical sum gate 332. As a result, when any of Conditions 1, 2, 3 described above is satisfied, the first logical product gate 333 outputs an enable signal enable="0". Here, a second logical product gate 334 takes a logical product of the enable signal enable and the input clock p_CLKi to produce the internal clock inter_CLKi. Therefore, when the enable signal indicates "0" as described above, the internal clock inter_CLKi of the image segmentation cell stops.

When any of the Conditions 1 to 3 described above is satisfied, the mode is shifted to the standby mode by a circuit constitution of a gated clock for stopping the supply of the clock signal to each cell and coupling weight register, and the operations of the cell and coupling weight register are stopped to reduce the power consumption. Since this function is incorporated in each cell and coupling weight register, the power consumption is reduced.

Figure 12:
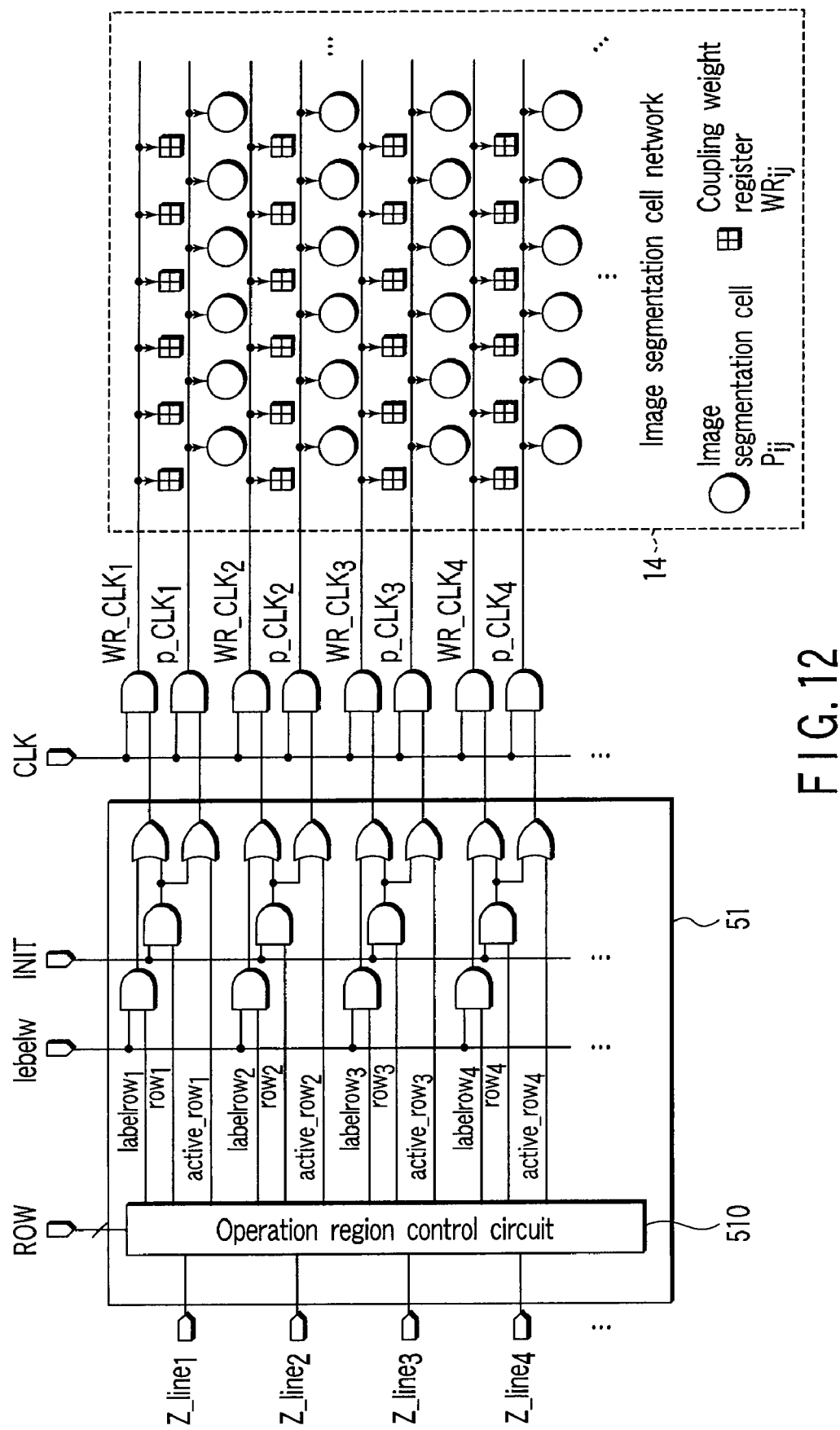
FIG. 12 is a logic circuit diagram showing a constitution of a row clock control circuit which performs a clock control with respect to the whole image segmentation cell network in the BAO state detection circuit of FIG. 11.

FIG. 12 is a logic circuit diagram showing a constitution of a row clock control circuit 51 which performs a clock control with respect to the whole image segmentation cell network 14. FIG. 12 shows a realization example in a row direction, but a column direction can also be realized in a similar system. The image segmentation cell and coupling weight register differ with operated conditions, and are efficiently controlled using separate clock lines WR_CLKi and p_CLKi.

Figure 13C:
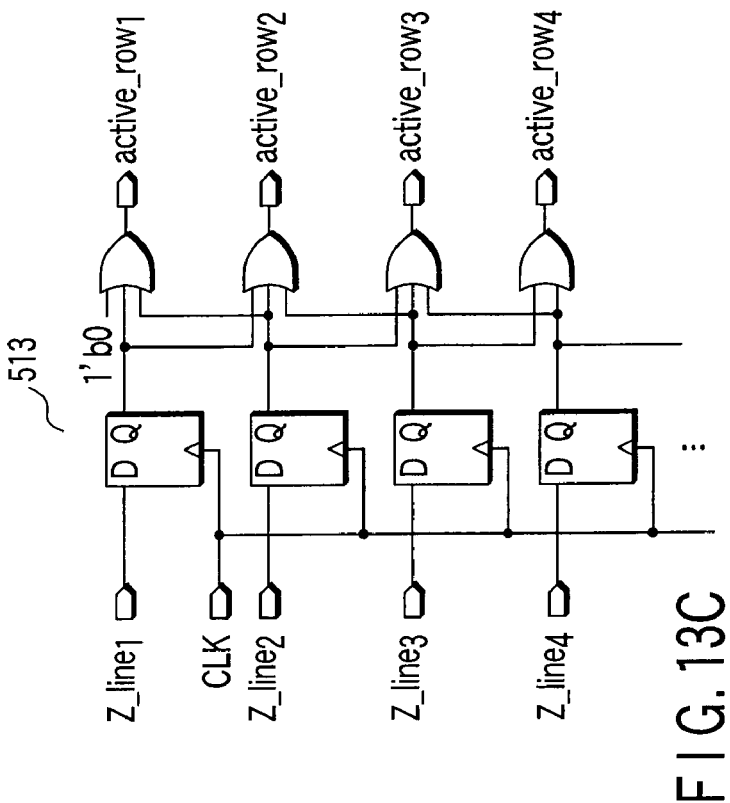
FIGS. 13A to 13C are block diagrams showing concrete constitutions of a row decoder constituting each operation region control circuit, a label write row selection circuit, and a boundary cell active circuit.
Figure 13A:
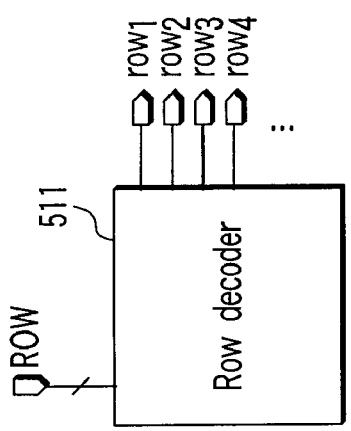
Figure 13B:
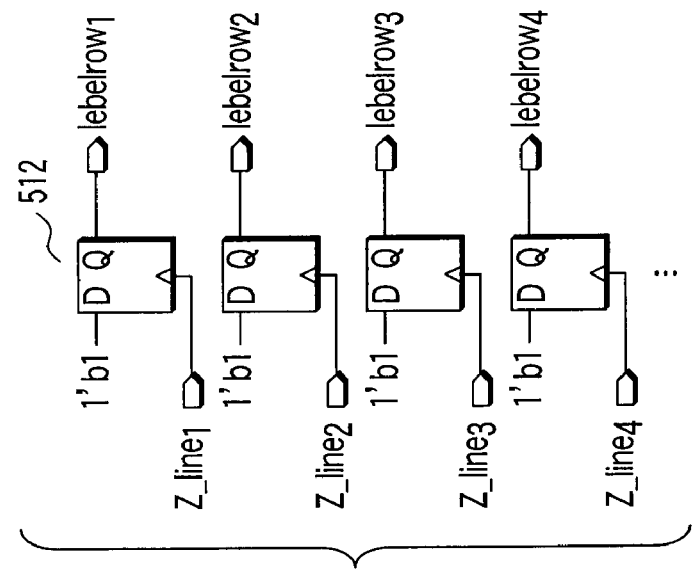

The row clock control circuit 51 shown in FIG. 12 comprises several gates centering on an operation region control circuit 510. The operation region control circuit 510 comprises three components: a row decoder 511 shown in FIG. 13A; a label write row selection circuit 512 shown in FIG. 13B; and a boundary cell active circuit 513 shown in FIG. 13C.

The operation of the row clock control circuit 51 shown in FIG. 12 will be concretely described. First, when an initialization signal INIT is input, that is, information of the coupling weight, leader cell, and the like is written into the cell or the coupling weight register, a clock CLK is supplied only to a part in which writing is performed. To effect this, the logical product of a selection signal rowi with respect to a write row and the initialization signal INIT is taken from a row selection signal ROW through the operation region control circuit 510, and accordingly the enable signal is issued.

During an image segmentation operation, information of a row in which the cell ignited by a Z_linei signal of each row exists can be obtained. The clock is supplied only to the image segmentation cell of the vicinity (boundary of the region growth) ignited based on the signal. In a boundary cell active circuit of FIG. 13C, a signal of active_rowi is set to 1 only in a case where signals of upper/lower rows Z_linei−1, Z_linei+1 are 1, and the clock CLK is supplied. When the label number is written into the coupling weight register, it is not necessary to write the label in a non-ignited region. Therefore, the logical product of information labelrowi of an ignition region detected by the operation region control circuit 510 and a label write signal is taken, and the clock CLK is supplied only to a necessary portion. The information of the ignition region is obtained by the label write row selection circuit shown in FIG. 13B. When Z_linei changes to 1 from 0, that is, when an ignition operation occurs in the row, 1 is set to the register to store the occurrence of the ignition. When the region to operate is specified in the process of the image segmentation as described above, the supply of the clock CLK can be controlled to reduce the power consumption.

Figure 14:
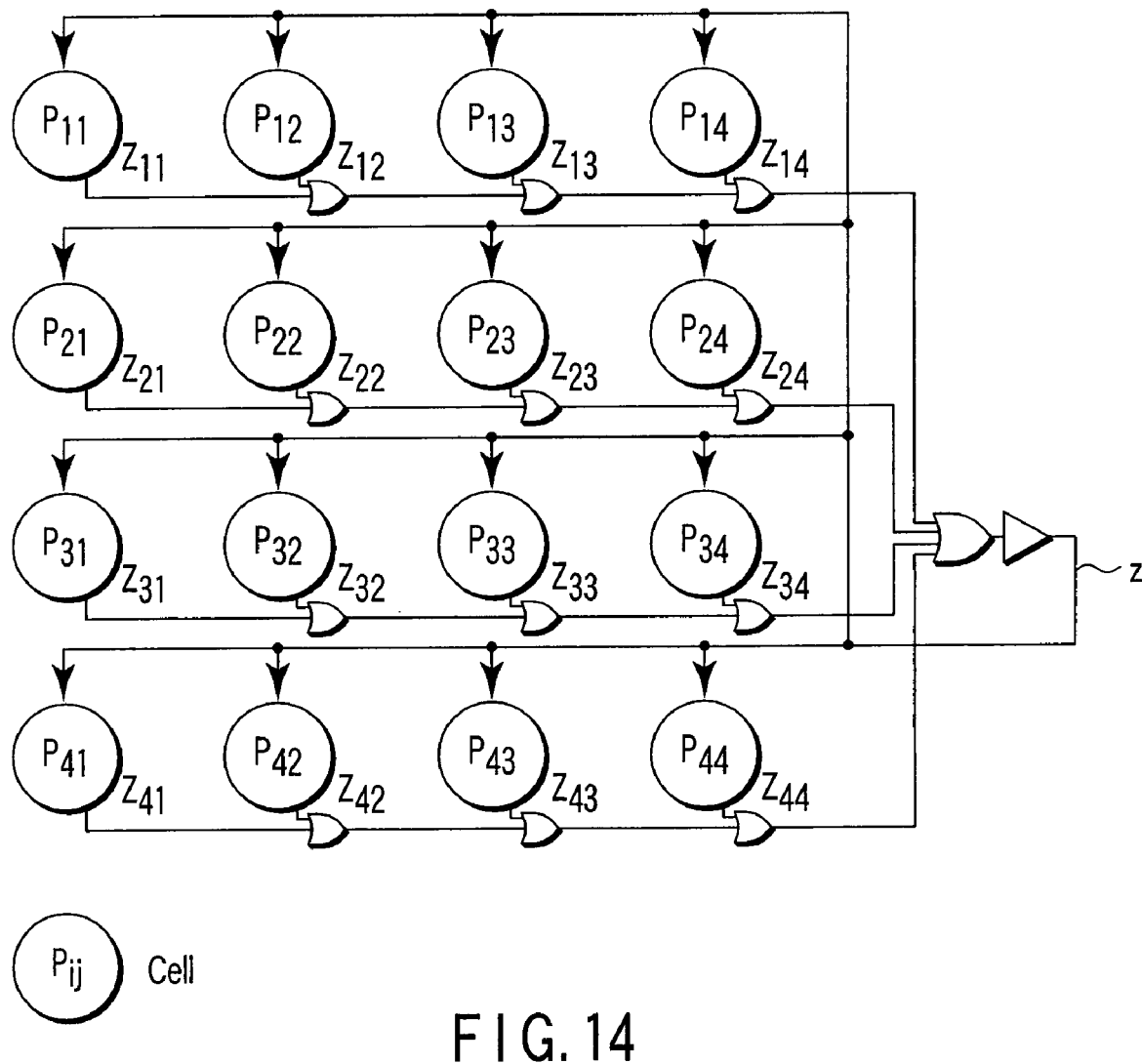
FIG. 14 is a diagram showing a connection example of a global suppressor signal based on a conventional architecture.

It is possible to apply the BAO method also to a global suppressor circuit. As a method of realizing the operation of the global suppressor of the above-described algorithm, a method shown in FIG. 14 was performed in the conventional architecture. That is, in a connection example of the global suppressor shown in FIG. 14, an output signal zij of each image segmentation cell Pij (corresponding to the signal zi of the cell Pi of the above-described algorithm) takes the logical sum (OR) with the output of the adjacent cell, and a signal which has taken the logical sum (OR) constitutes the whole global suppressor z. The signal of z is fed back to the control circuit 28 of each cell via a buffer memory.

Figure 15:
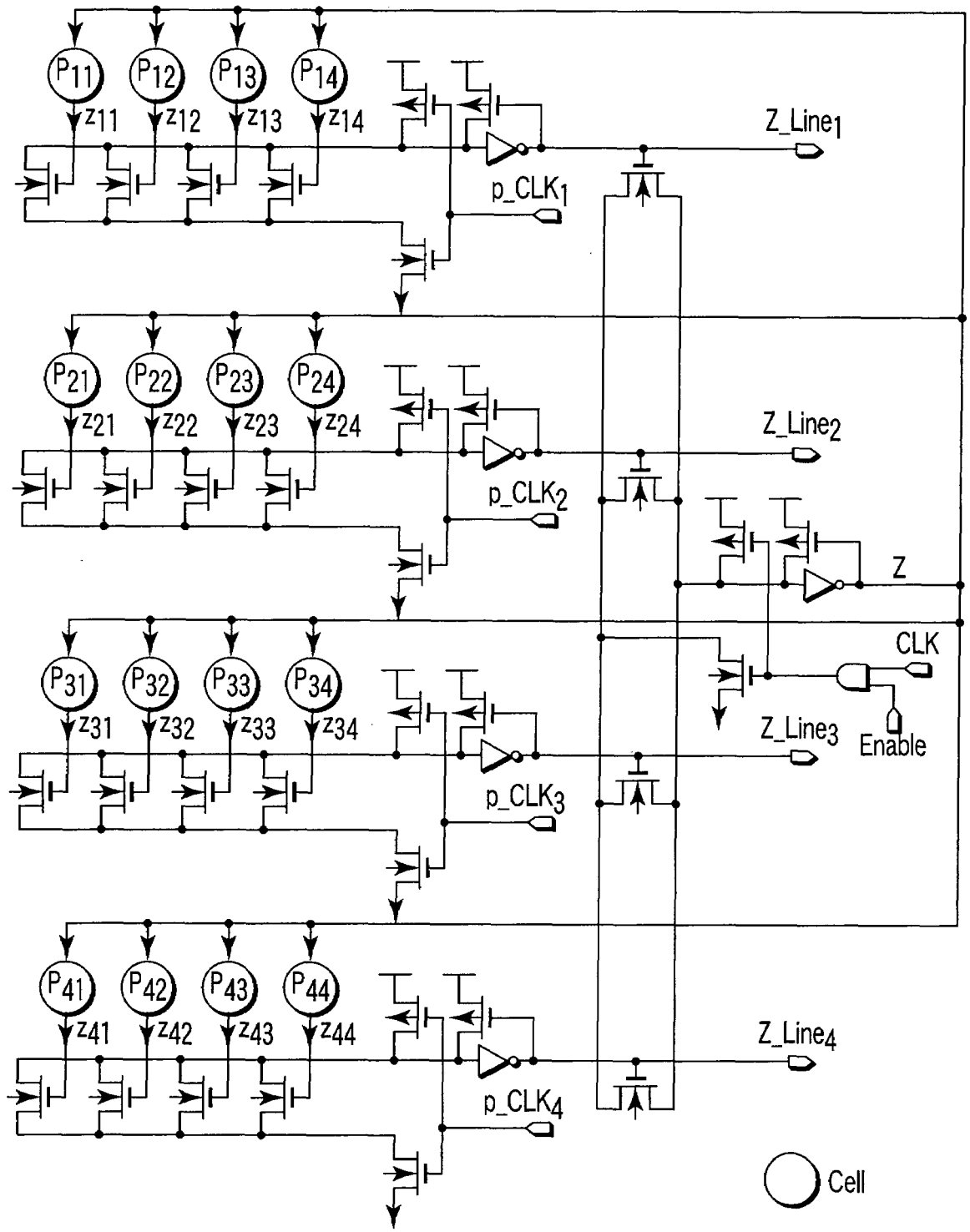
FIG. 15 is a diagram showing a connection example of the global suppressor signal based on the architecture of the present invention.

In this method, the logical sum of state signals zi of all the cells is taken in order for each clock cycle regardless of presence/absence of the state change of each cell, the signal propagation delay time lengthens, and an increase of power consumption is incurred. Therefore, in the present invention, the signal of the global suppressor is connected as shown in FIG. 15 (4×4 cell network). In this constitution, a dynamic global suppressor circuit having a function of taking the logical sum of the state signals of all active cells Pij is used. According to the constitution, if a newly ignited cell exists in a row i, an output of the global suppressor circuit of the row i is "1" (Z_linei=1). In the global suppressor circuit, the unnecessary signal from the cell in the standby mode and the supply of the clock are cut to reduce the power consumption. Furthermore, further reduction is realized by omitting calculation of the logical sum of the row in which the cell in the active mode does not exist.

[Reduction Method of Power Consumption by Subdivided Image Approach (SIA)]

In the methods proposed in Documents 4 to 6, 10 described above, when the image segmentation of the VGA size image is performed, the cell network corresponding to an image size needs to be realized. Therefore, in an integrated circuit, there is a defect of an increase of chip size. Moreover, the respective cells simultaneously operate in parallel in order to perform the real-time processing. Therefore, there is a problem that when the number of cells increases, the power consumption accordingly increases. Therefore, since it is difficult to process the image having the VGA size in a small area with low power consumption as such, the processing is not suitable for battery-driven devices such as a portable terminal.

To solve the problem, in the present invention, the subdivided image approach (SIA) is proposed as a method of processing the image in real time with small area/low power consumption with respect to a large-scaled image.

Figure 16:
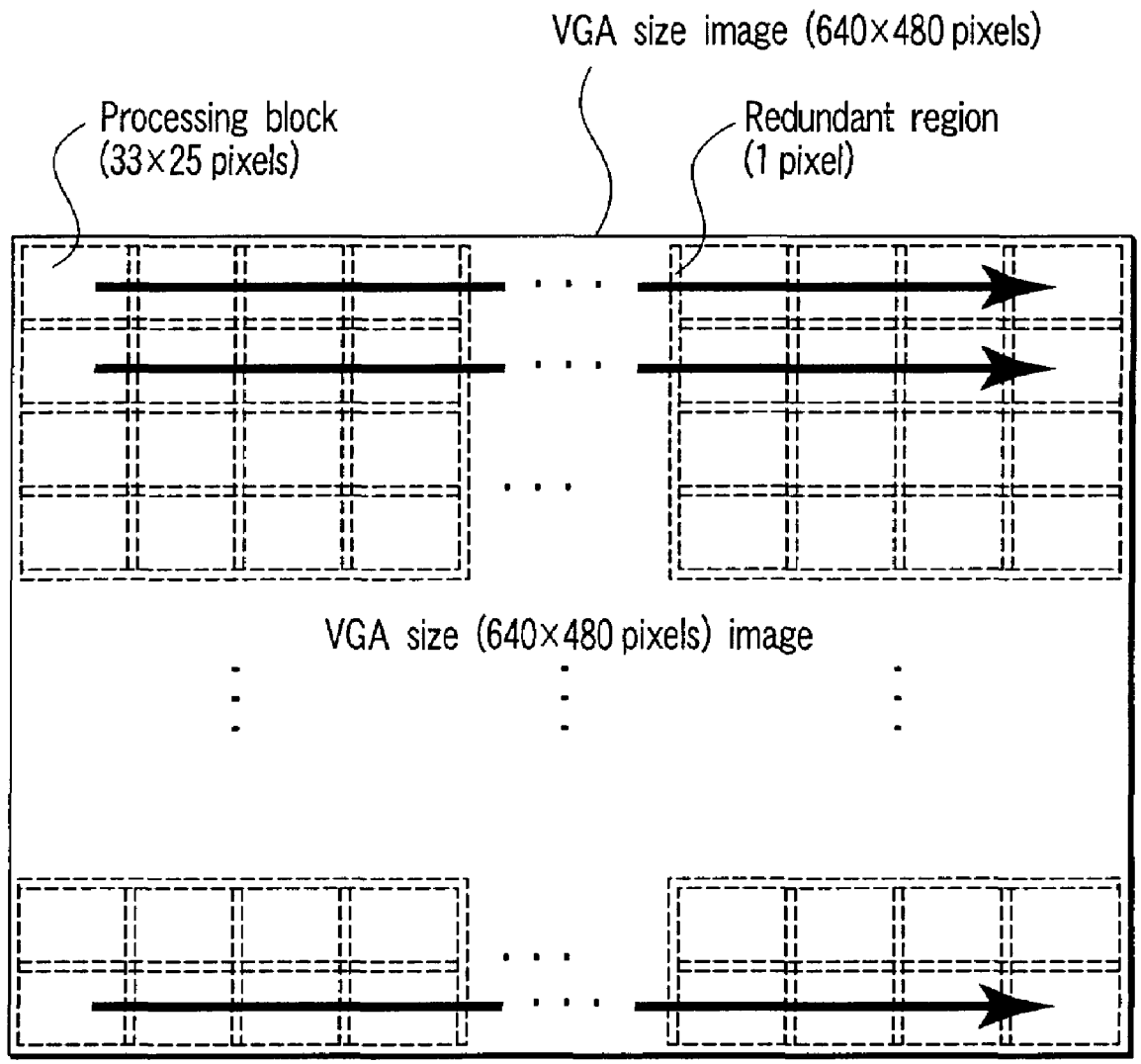
FIG. 16 is a diagram showing an image segmentation example of a VGA size image using a subdivided image pipeline processing method based on a subdivided image approach (SIA) proposed by the present invention.

In this method, as shown in FIG. 16, a large-scaled image (VGA size (640×480 pixels) image in the example) is divided into a plurality of small-scaled blocks (33×25 pixels in the example of FIG. 16), and each block is subjected to the image segmentation using the image segmentation cell network in which the BAO method of the present invention is incorporated. Based on the result, the image segmentation of each block is successively performed in order, and the results are finally put together to perform the whole image segmentation.

In FIG. 16, when the image is divided into blocks, a partial region included in the same image segmentation region can be detected based on the result of the image segmentation obtained in each block. To effect this, each block is divided in such a manner that a boundary between the blocks overlaps with the adjacent block by at least one or more pixels. Moreover, in the image segmentation of each block, the pixel included in a region including the image segmentation exists in the portion overlapping with the adjacent block. In this case, the cell is determined beforehand as the leader cell in the leader cell determination circuit. Accordingly, the image segmentation of the block being processed can be performed using the dividing result in the previously processed block.

With respect to the divided regions, a region number is added as a label in a case where the blocks are included in the same divided region. Therefore, a correspondence table of label numbers attached to the pixels superimposed upon the adjacent block in the boundary between the blocks is updated every block processing. The labels of all the regions are output in a stage in which the processing of all the blocks ends, and in this case, the label is changed in such a manner that the same region has the same label number. Accordingly, the result of the whole image segmentation performed for each divided block can be output without any contradiction.

Figure 17:
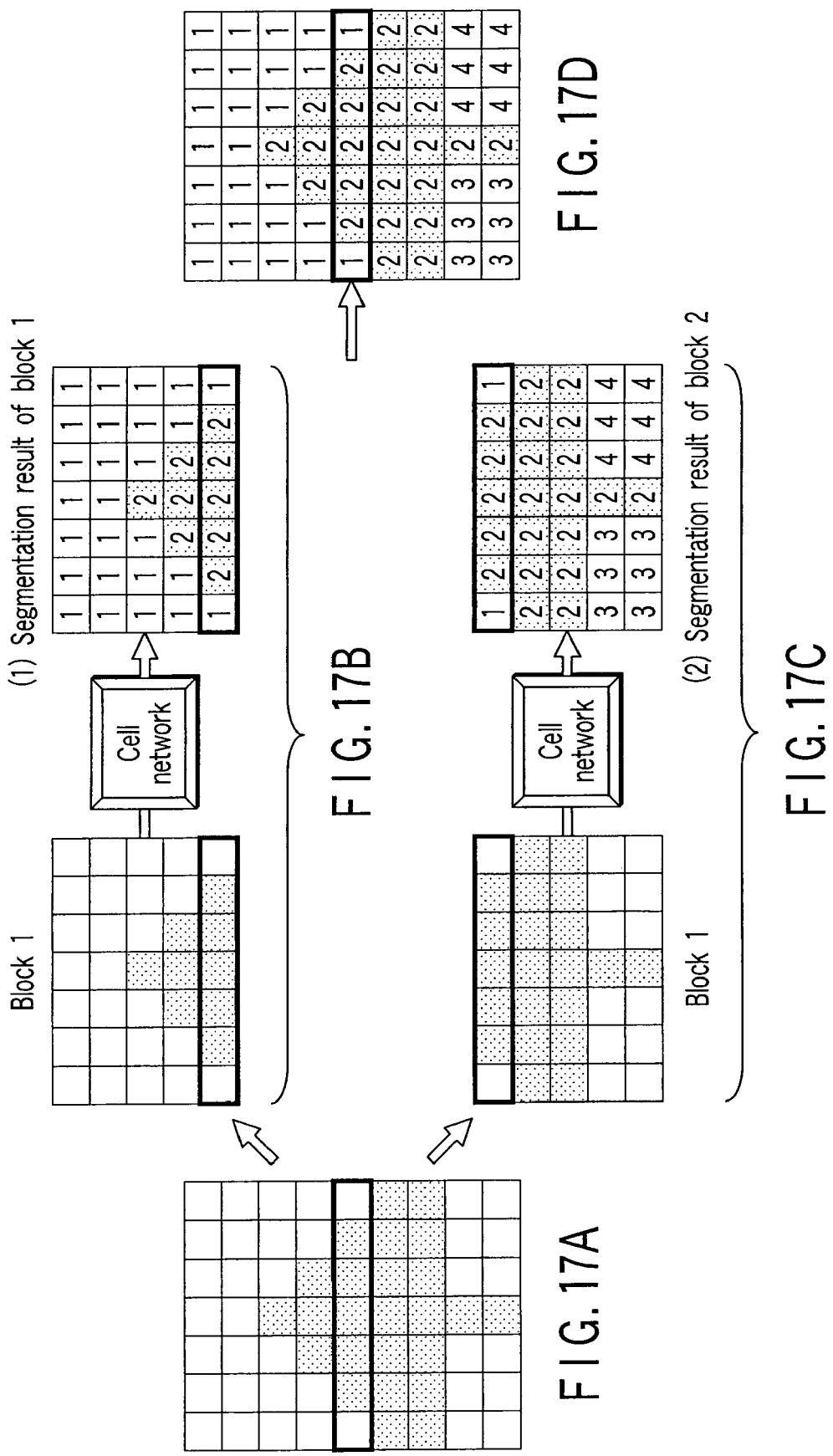
FIGS. 17A to 17D are diagrams showing a block pipeline image segmentation method by the SIA.

FIGS. 17A to 17D show simple examples of the image segmentation by block dividing by the SIA. First, when the image shown in FIG. 17A is input, the image is divided into Block 1 and Block 2 as shown in FIGS. 17B and 17C, and the image segmentation is performed in each block. A label is attached as an image segmentation result to each region, and the label needs to be associated with the same region. Therefore, the block is divided with an overlap by one pixel in the pixels of the boundary portion of each block. After the image segmentation is performed, the labels attached to the pixels of the boundary portion are matched in connecting Block 1 to Block 2 as shown in FIG. 17D.

Figure 18:
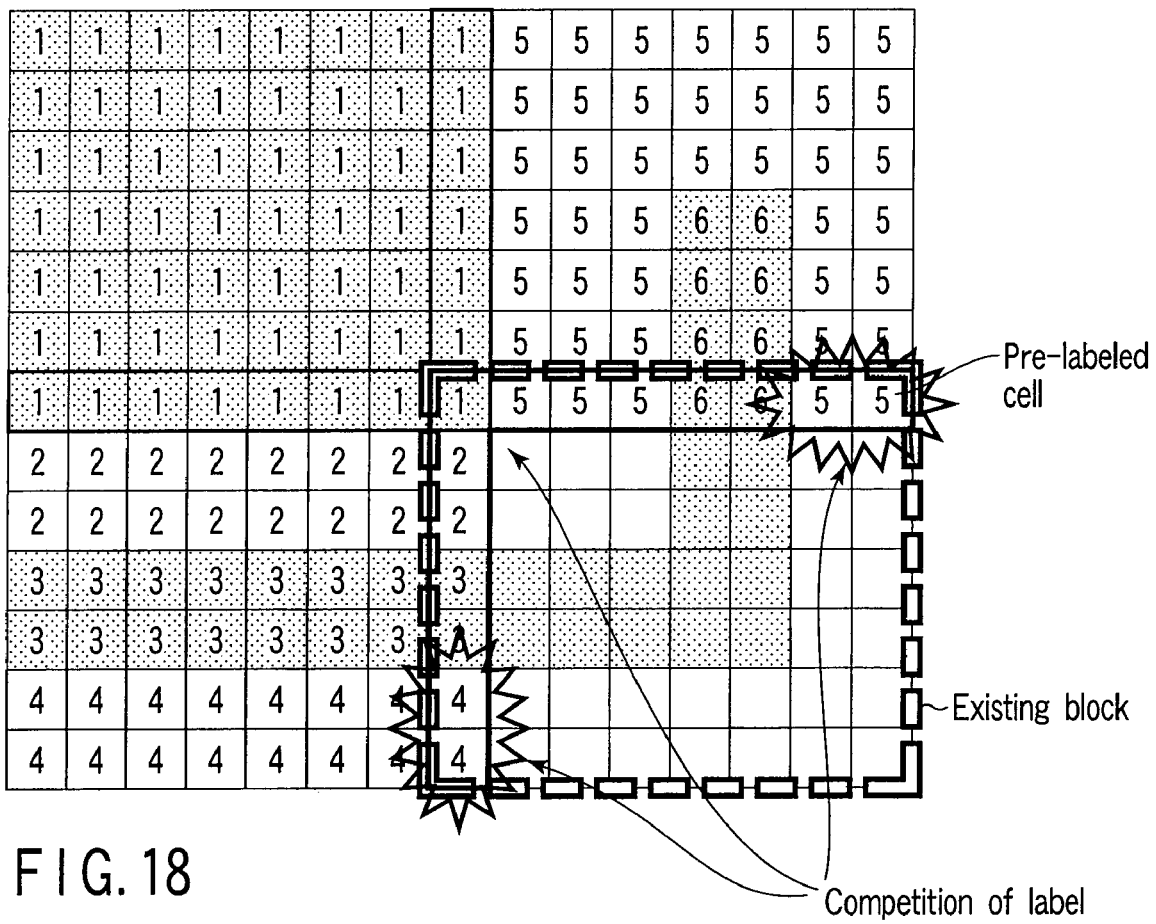
FIG. 18 is a diagram showing an example of label competition caused by the block processing of the SIA.
Figure 19:
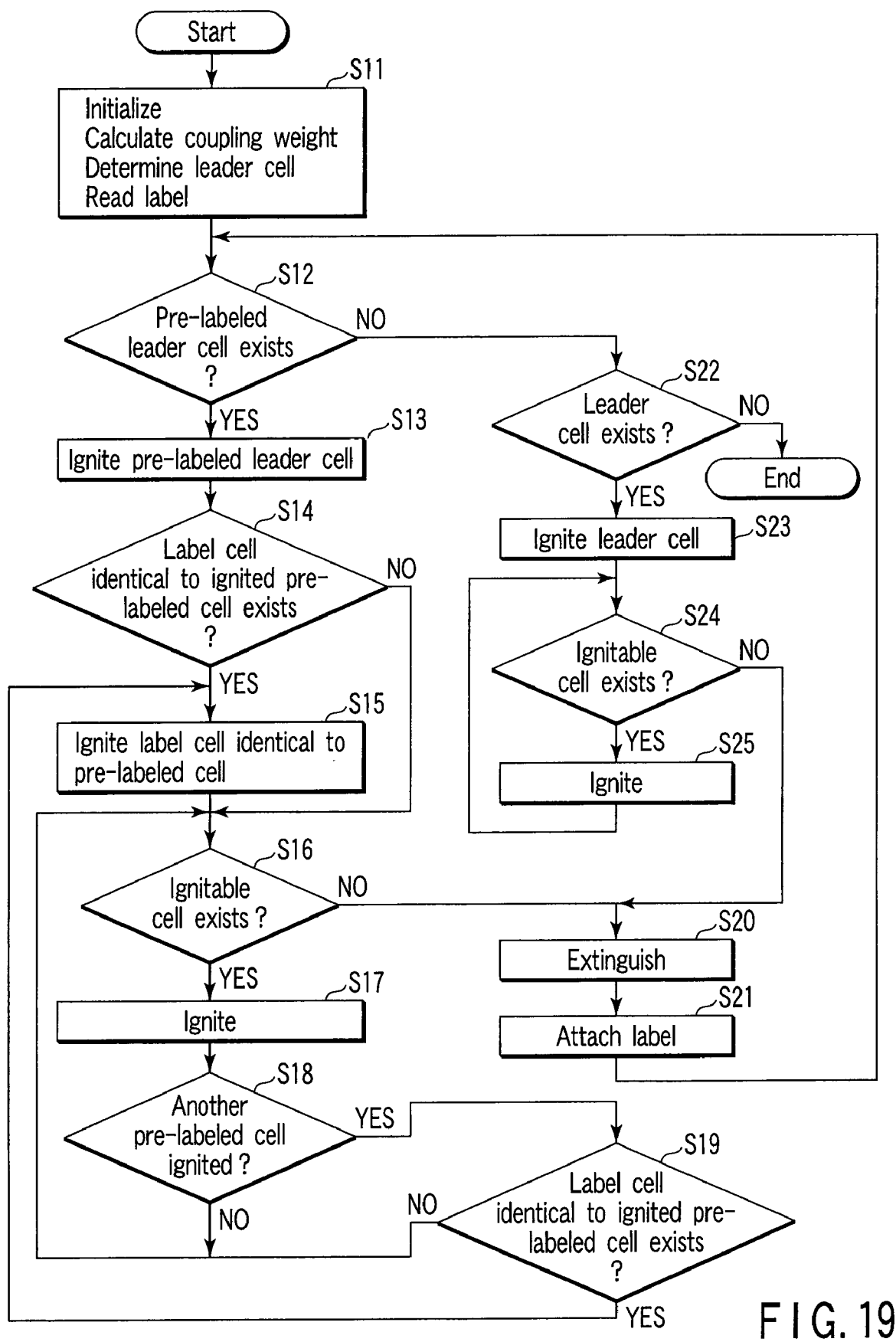
FIG. 19 is a flowchart showing an SIA image segmentation algorithm according to the present invention for solving the label competition shown in FIG. 18.

The image segmentation of each block is performed basically in accordance with the flowchart of the image segmentation in FIG. 1. Additionally, when one image is divided and processed into a plurality of blocks, as shown in FIG. 18, competition of the label numbers of the divided regions sometimes occurs. In FIG. 18, Labels 4, 5, and 2 are in the same divided region, but different labels are allocated. Then, a flowchart of an SIA image segmentation algorithm which solves this problem is shown in FIG. 19. This algorithm is based on the algorithm of FIG. 1, and processing for label competition is added. Details of the SIA image segmentation algorithm shown in FIG. 19 will be described below.

[SIA Image Segmentation Algorithm]

First in step S1, initialization is executed in accordance with an instruction for the image segmentation, the coupling weight indicating similarity between the adjacent pixels is calculated, and the leader cell which is the start point of the image segmentation is determined. The cell of a pre-labeled portion (hereinafter referred to as the pre-labeled cell) is forcibly determined as the leader cell (hereinafter referred to as a pre-labeled leader cell). Since the pre-labeled cell is labeled by the previous dividing, the label is read and stored beforehand.

Next, it is decided in step S12 whether or not the pre-labeled leader cell exists. When it is decided in step S12 that the cell exists, in step S13, the pre-labeled leader cell is ignited to start the image segmentation in the block. Subsequently, it is decided in step S14 whether or not the pre-labeled cell having the same label as that of the ignited pre-labeled leader cell exists. When it is decided in step S14 that the cell exists, the pre-labeled cell is ignited in step S15).

When the ignition of step S15 is completed, and it is decided in step S14 that the cell does not exist, it is decided in step S16 whether or not the ignitable cell exists. When it is decided in step S16 that the cell exists, ignition is performed in step S17.

Here, it is decided in step S18 whether or not another pre-labeled cell having a different label is ignited by the indicating of step S17. When it is decided in step S18 that the cell is not ignited, the process returns to step S16. When it is decided in step S18 that the cell is ignited, it is decided in step S19 whether or not the pre-labeled cell having the same label as that of the ignited pre-labeled cell exists. When it is decided in step S19 that the cell does not exist, the process returns to step S16. When it is decided in step S19 that the cell exists, the process returns to step S15.

When it is decided in step S16 that the ignitable cell does not exist, it is considered that the image segmentation in the region ends, extinguishment is performed in step S20, and the label of the pre-labeled leader cell ignited in step S21 is allocated as the label of the divided region. The process returns to step S12 to execute the segmentation of the next pre-labeled leader cell. Subsequently, the process of steps S12 to S21 is repeated until all the pre-labeled leader cells are ignited.

When it is decided in step S12 that the pre-labeled leader cell does not exist, it is decided in step S22 whether or not the leader cell other than the pre-labeled leader cell exists. When it is decided in step S22 that the leader cell exists, the leader cell is self-ignited in step S23. Next, it is decided in step S24 whether or not the ignitable cell exists. When it is decided in step S24 that the cell exists, the cell is ignited in step S25, and the process returns to step S24 to ignite all the ignitable cells with the ignition of one leader cell.

When it is decided in step S24 that the ignitable cell does not exist, it is considered that the image segmentation of the region is completed, and the process returns to step S20 to perform the extinguishment. In step S21, a new label number is produced and attached to each cell of the divided region, and the process returns to step S12.

When it is decided in step S22 that the leader cell does not exist, and a series of processes described above are completed, the label of each cell is read and stored in the memory for storing the divided region in an end process. The competition of the labels between the pre-labeled cells in the region is handled by storage of the label of the ignited pre-labeled cell during the dividing of the region.

Figure 20:
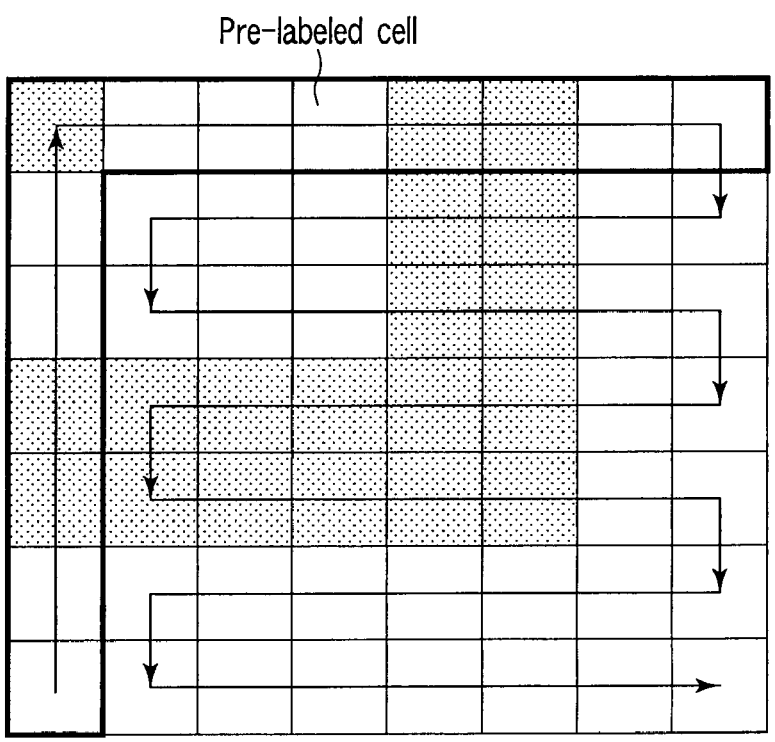
FIG. 20 is a diagram showing an example of a propagation order of an ignition permission signal with respect to a leader cell in an "existing block" portion of the image shown in FIG. 18.

A dividing procedure in one block in the SIA image segmentation algorithm will be described with reference to FIGS. 20 and 21A to 21F. FIG. 20 shows an example of a propagation order of an ignition permission signal with respect to the leader cell in an "existing block" portion of the image shown in FIG. 18. FIGS. 21A to 21F show that the block is subjected to the image segmentation by the SIA in the example shown in FIG. 20.

First, the coupling weight between the cells is calculated, and the leader cell is determined based on the weight. At this time, the cells of the pre-labeled portion (pre-labeled cells) are all set to the leader cells (pre-labeled leader cells). While the coupling weight is calculated and the leader cell is determined, the labels of the pre-labeled cell to which the labels are attached in the dividing of the previous block are read beforehand (step S11 of FIG. 19).

Figure 21A:
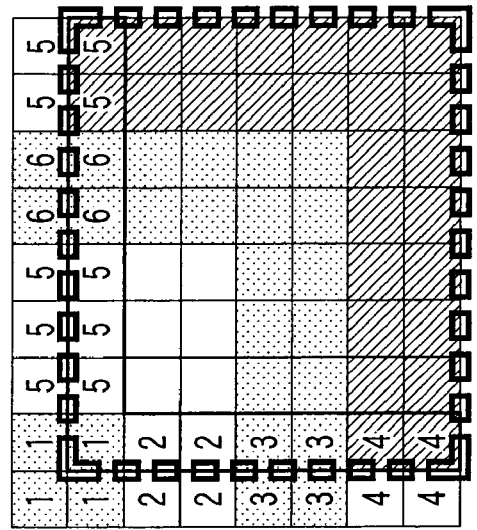
FIGS. 21A to 21F are diagrams showing that the block is subjected to the image segmentation by the SIA in the example shown in FIG. 20.
Figure 21B:
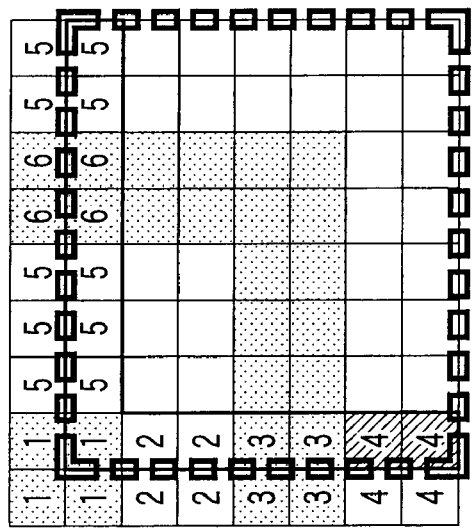

Next, the leader cells are ignited in order as shown in FIG. 20. As shown in FIG. 21A, first the pre-labeled leader cell in a predetermined position (left-end lowest portion here) in a boundary region is ignited (step S13 of FIG. 19). Next, when the pre-labeled leader cell is ignited, the label of the pre-labeled leader cell is compared with that of another pre-labeled cell. As shown in FIG. 21B, the pre-labeled cell having the same label is also ignited if any (step S15 of FIG. 19).

Figure 21C:
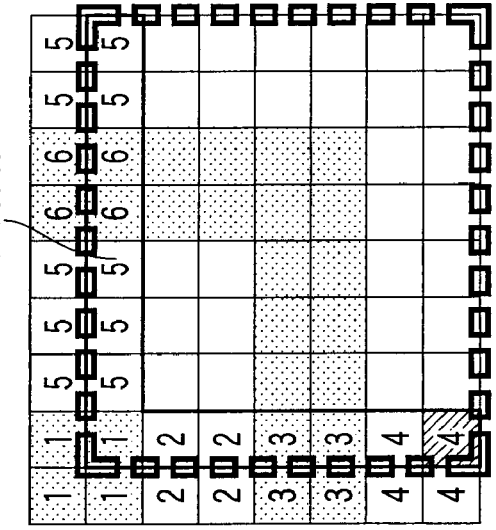
Figure 21D:
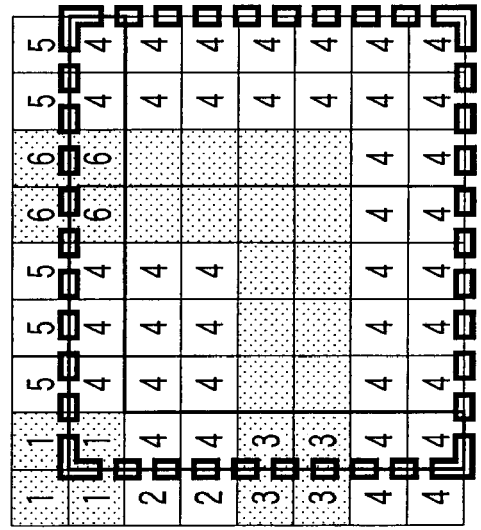

After the ignition of the leader cells, a sum of the coupling weight of the ignited cell with each cell is calculated in accordance with the procedure shown in FIG. 1, and the ignition is performed (step S17 of FIG. 19). When the other pre-labeled cell is ignited by the ignition as shown in FIG. 21C, the pre-labeled cell having the same label as that of the ignited pre-labeled cell is ignited as shown in FIG. 21D (step S19 of FIG. 19). This process is performed until the cell to be ignited does not exist (steps S15 to S19 of FIG. 19).

Figure 21E:
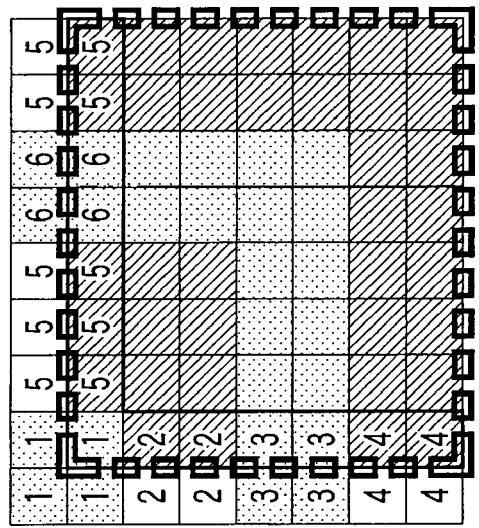
Figure 21F:
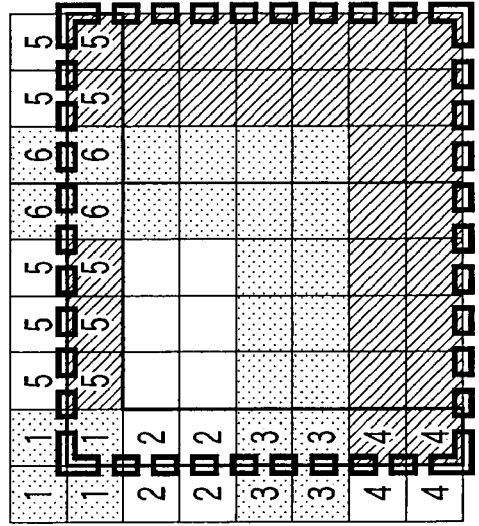

When the ignition ends, as shown in FIG. 21E, the image segmentation by the ignition ends, and the divided region is determined. After each cell of the region divided by the ignition in this manner is subjected to the extinguishment (step S20 of FIG. 19), as shown in FIG. 21F, the label of the leader cell which is an igniter is numbered (step S21 of FIG. 19).

The labels of the pre-labeled cells ignited during the dividing of the region are successively stored in the above-described process, and accordingly the correspondence of the labels among the blocks is stored. The above-described processes are repeated until all the leader cells are ignited (steps S12 to S25 of FIG. 19). Accordingly, the image segmentation in the block ends. The result is stored, and the next block is subjected to the image segmentation.

As described above, according to the SIA image segmentation algorithm of the present invention, it is possible to securely attach the same label to the same region in each divided block.

FIG. 22 is a block diagram showing a constitution of an image segmentation apparatus using the SIA. It should be noted that in FIG. 22, the same components as those of FIG. 2 are denoted with the same reference numerals, and redundant description is omitted here.

In the apparatus shown in FIG. 22, a label control circuit 17 and an SIA control circuit 18 are added to the image segmentation apparatus shown in FIG. 2, and further an image segmentation cell network 14' for exclusive use in the SIA is used instead of the image segmentation cell network 14 of FIG. 2.

Figure 23:
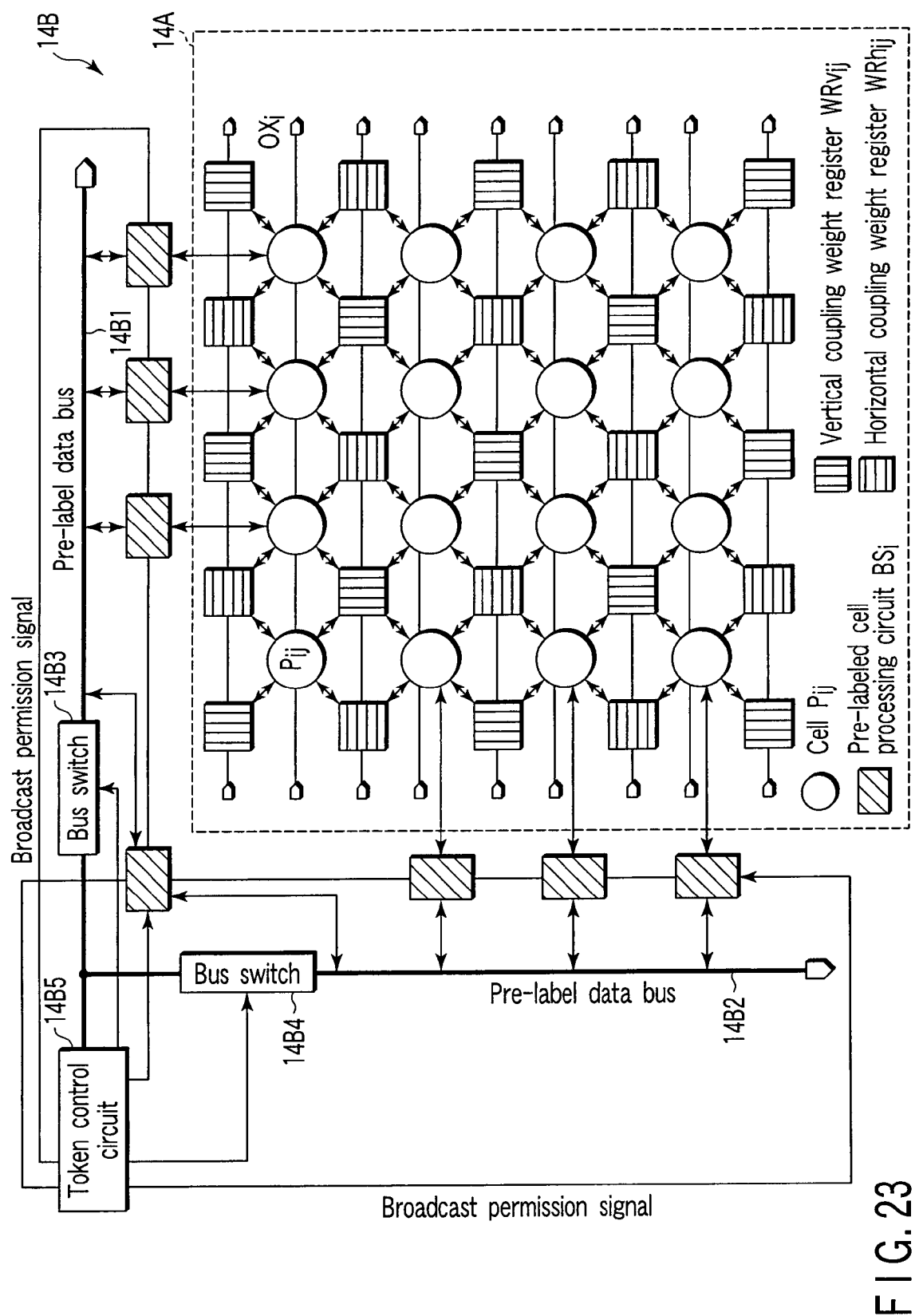
FIG. 23 is a block diagram showing a constitution example of an image segmentation cell network for the SIA.

FIG. 23 is a block diagram showing a constitution example of the image segmentation cell network for SIA 14'.

The image segmentation cell network for SIA 14' shown in FIG. 23 comprises a selection circuit 14B for avoiding the competition of the labels in the pre-labeled cells together with a cell network 14A having the same constitution as that of a conventional image segmentation cell network shown in FIG. 2. In the selection circuit 14B, data buses 14B1, 14B2 are arranged on upper and left sides of the cell network 14A, and the respective data buses 14B1, 14B2 are connected to a token control circuit 14B5 via bus switches 14B3, 14B4. Moreover, the cells Pij arranged in upper and left ends of the cell network 14A are connected as the pre-labeled cells to pre-labeled cell processing circuits BSi, and are selectively connectable to the data buses 14B1, 14B2 by the processing of these pre-labeled cell processing circuits BSi. The data buses 14B1, 14B2 are selectively active by a bus switch signal output from the token control circuit 14B5. Each pre-labeled cell processing circuit BSi executes broadcasting in response to a broadcast permission signal output from the token control circuit 14B5.

FIG. 24 shows a constitution of a cell network corresponding to a portion which processes the pre-labeled cell. In FIG.

24, Ci denotes an image segmentation cell, Wij denotes a coupling weight register, and BSi denotes a pre-labeled cell processing circuit. Signals b_pre, b_next are input/output signals of token passing for performing the broadcasting described later, and b_label is a broadcast signal to the data bus or a signal of the broadcast label. A signal LM is a control signal for forcibly bringing the pre-labeled cell into the ignited state.

The coupling weight register Wij has the same constitution as that shown in FIG. 8.

Moreover, the image segmentation cell Ci concretely has a constitution shown in FIG. 25 or 26. The constitutions shown in FIGS. 25, 26 are basically the same as those of FIGS. 7A, 7B. Therefore, in FIGS. 25 and 26, the same parts as those of FIGS. 7A and 7B are denoted with the same reference numerals, and the description is omitted. A difference lies in a constitution in which a control circuit 28' shown in FIGS. 25 and 26 forcibly performs the ignition by the signal LM from the pre-labeled cell processing circuit BSi.

In a portion which processes the pre-labeled cell, as described above in the SIA image segmentation algorithm, the ignited pre-labeled cell is compared with the label attached to the divided region of the pre-labeled portion of the block previously subjected to the image segmentation, and the pre-labeled cell having the same label needs to be ignited. To effect this, as shown in FIG. 27, the pre-labeled cell processing circuit BSi comprises: a previous label register BS-1 in which the label of the segmentation result in the previous image segmentation is stored; a label comparator BS-2 for use in comparing the stored label with the label number or the leader cell being ignited; a pre-label ignition flag register (a value is held data is assumed as Bi) BS-3 for use in the broadcasting; and a control circuit BS-4 which controls input/output of signals of the respective circuits BS-1 to BS-3.

Figure 27:
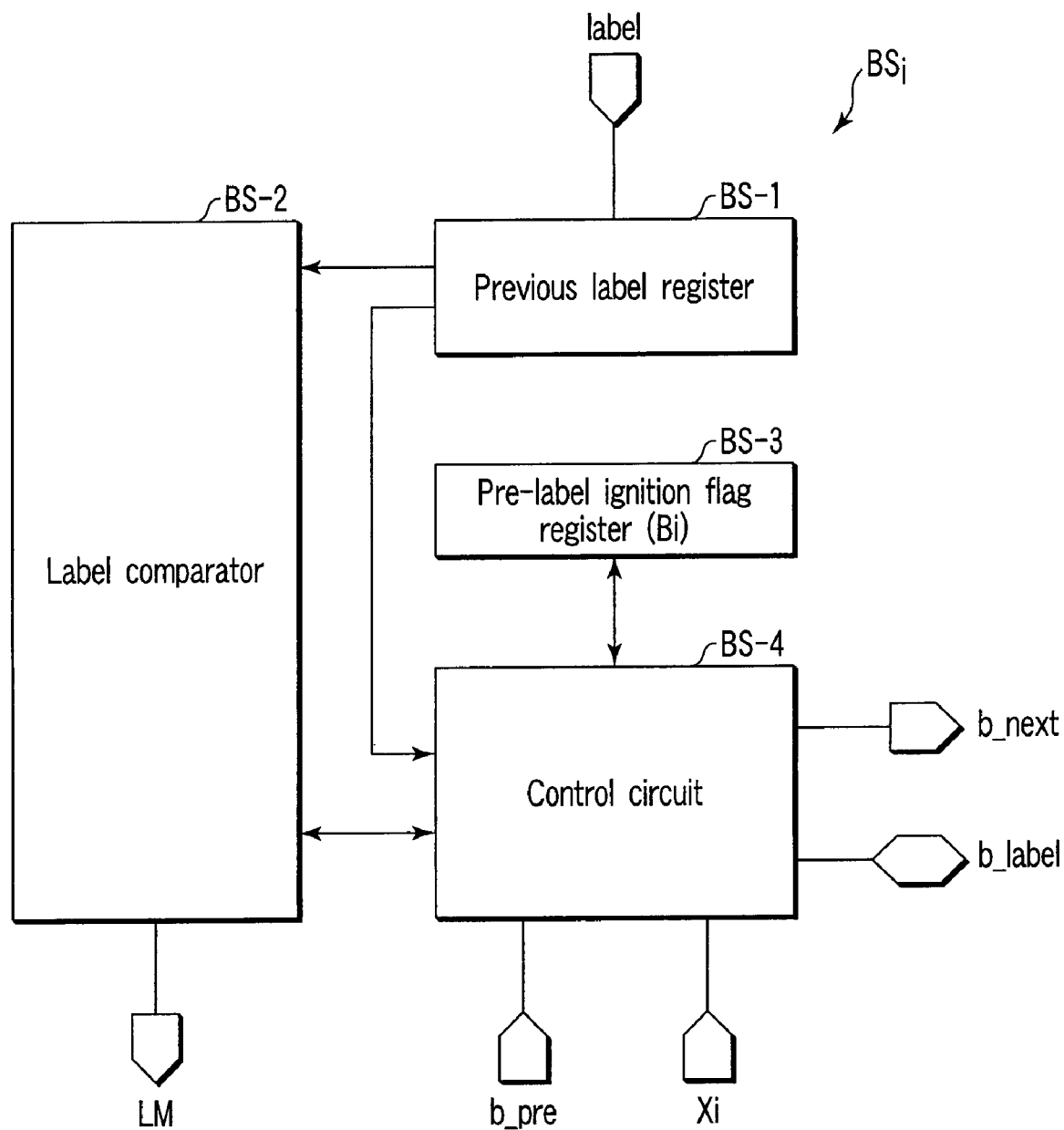
FIG. 27 is a block diagram showing a concrete constitution of a pre-labeled cell processing circuit of FIG. 23.

When the corresponding pre-labeled cell is ignited (Xi=1) in the pre-labeled cell processing circuit BSi shown in FIG. 27, the label (b_label) stored in the previous label register BS-1 is broadcast to all the other pre-labeled cells through the data bus in order to ignite the cells having the same label in the other pre-labeled cells at the same time. Additionally, when there are a plurality of ignited pre-labeled cells, the respective ignited pre-labeled cells needs to be limited so as not to execute the broadcasting at the same time. To solve the problem, the pre-labeled cell processing circuit BSi includes the pre-label ignition flag register (Bi) BS-3, and the corresponding pre-labeled cell is regarded as a candidate of a broadcastable cell as long as the value Bi held in the register BS-3 is 1.

On the other hand, the token control circuit 14B5 sends the broadcast permission signal having a token b_pre=1 to the pre-labeled cell processing circuit BSi to execute a control in such a manner that the broadcasting is executed only by the pre-labeled cell processing circuit BSi whose held value in the register BS-3 is Bi=1 and which has received the token b_pre=1.

Moreover, in the pre-labeled cell processing circuit BSi, the value of the pre-label ignition flag register BS-3 is set to Bi=0 so as not to perform the broadcasting of the same label again with respect to the pre-labeled cell ignited simultaneously after the broadcast label (b_label) matches the label of the corresponding pre-labeled cell stored in the previous label register BS-1. Furthermore, data of competitive labels is transferred to the label control circuit 17 shown in FIG. 22 through the data bus in order to store correspondence of the competitive labels during the image segmentation of the region.

An example of a method of transferring the broadcast permission signal with respect to the pre-labeled cell will be described in the image segmentation cell network for SIA 14' shown in FIG. 23. Four cases where the portion including the pre-labeled cell in each block exists only on the upper side of the cell network, only on the left side, and both on the upper and left sides, and does not exist are considered depending on the portion including the processed block during the segmentation of the whole image into the blocks in FIG. 18. Therefore, the bus switches 14B3, 14B4 are prepared in a left upper portion in which the upper pre-label intersects with the left pre-label, the bus switches 14B3, 14B4 are selectively set to be active by the token control circuit 14B5, and accordingly the selection circuit 14B is set for each block.

Moreover, as described above, to avoid the broadcasting by a plurality of pre-labeled cells, the token passing of the broadcast permission signal is performed with respect to the pre-labeled cell processing circuit BSi by the token control circuit 14B5 in order of arrows in the drawing. Accordingly, only the pre-labeled cell processing circuit in which Bi=1 and which has received the token b_pre=1 can execute the broadcasting.

Upon receiving the token, each pre-labeled cell processing circuit BSi decides (Bi=1) whether or not the broadcasting is executable. If possible, the broadcasting is performed to transfer the token to the adjacent cell. If not possible, the token is transferred to the adjacent cell without executing the broadcasting. The token passing is repeatedly performed in the pre-labeled cells until all the pre-labeled cells are ignited. When all the pre-labeled cells are ignited, the transfer of the permission signal in the pre-labeled portion is ended. As shown in FIG. 20, the token is used for successively igniting inner leader cells as shown in FIG. 20.

Concretely as shown in FIG. 28, the label control circuit 17 comprises a label control unit 171, a counter 172, a D-latch type flip flop 173, and an AND gate 174. The circuit receives pre-label data (pre_labeled) of each block, label number (labeli), and global suppressor Z in synchronization with the clock CLK, and obtains an exception signal and label number in each block to notify the SIA control circuit 18.

The SIA control circuit 18 shown in FIG. 29 designates a pixel address raddr designated from the outside in the input image memory 11 to read image data Ii by a block unit. In this case, the SIA control circuit 18 reads the data in which the boundary portion of the block overlaps by one pixel as shown in FIGS. 17A to 17D.

A flow of processing of the SIA control circuit 18 will be described hereinafter.

(a) Processing Associated with Input

Step 1: A memory address of the input image memory 11 is designated in an output port raddr. Since the number of blocks and that of input pixels are determined, the address of the pixel for each block including the overlapped portions is uniquely determined.

Step 2: When the calculation result of the leader cell is input into an input port ppi from the leader cell determination circuit 13, and the dividing result of the previous block shows that the cell is included in the region already including the overlapped portions (the cell has the label number), the cell is regarded as the leader cell, the value of pi is set to "1", and the value is output to the cell network 14 from an output port pi.

(b) Processing During Segmentation and at Output Time

Step 1: When the exception signal "exception" is received, the corresponding label number is received from the input port "label", and written into a label table in the SIA control circuit. For example, when the label numbers 1, 2 are included in the same image segmentation region, data "1" is written in an address "2". As a rule for changing the label number at this time, for example, the data is rewritten into a smaller label.

Step 2: When the processing ends by a block image unit in the cell network 14, the label number is received from the input port "label", and written in the divided region storage circuit 15. In this case, the address is processed via the rwaddr port, and the label number is processed via the label port.

Step 3: When the image segmentation ends in all the blocks, and there is a read request into the divided region storage circuit 15 from a higher level image processing application, the SIA control circuit 18 which has received read address raddr reads the label number from the divided region storage circuit 15 to designate and read the address rwaddr. Additionally, in this case, the circuit refers to the label table, and rewrites the label which needs to be rewritten (label corresponding to the divided region extending over a plurality of blocks) into the corresponding label number to output the label via an output port SIA_label.

Next, the coupling weight Wij and leader cell ppi are determined as usual using the existing coupling weight calculation circuit 12 and leader cell determination circuit 13. Additionally, since the previously processed block is already subjected to the image segmentation, the leader cell is rewritten through the SIA control circuit 18 in order to forcibly constitute the leader cell with respect to the pre-labeled portion already including the label. That is, the labeled cell in the pre-labeled portion is set to pi=1 (update of pi).

The above-described data is sent to the image segmentation cell network 14 to start the image segmentation.

When the image segmentation is started, the end of the ignition operation of the region can be detected by falling of the z signal of the global suppressor circuit to "0" from "1".

Figure 30C:
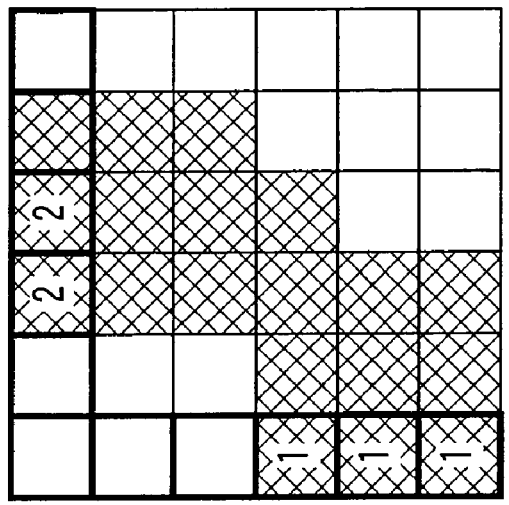
FIGS. 30A to 30C are diagrams showing a flow of the image segmentation of each processing region in the SIA.
Figure 30B:
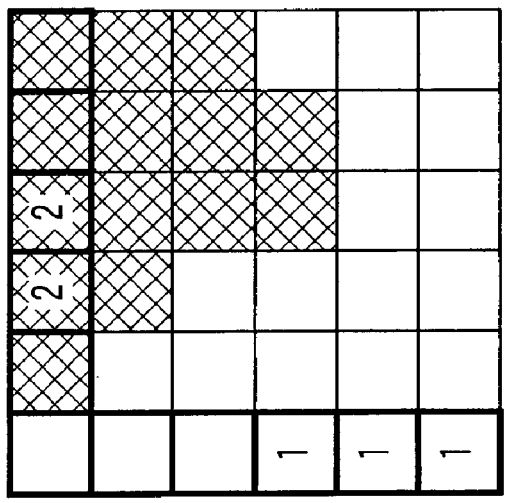
Figure 30A:
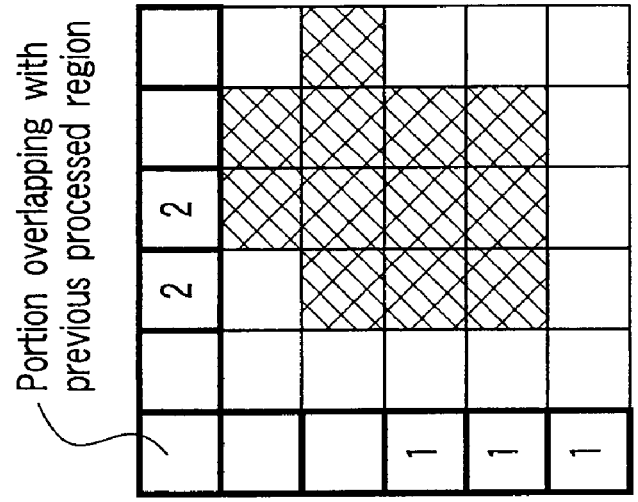

In the label control circuit 17, a write signal labelw is set to write the same label number label in the same ignited region. The operation of the SIA architecture of the present invention at this time is slightly different from that of the conventional image segmentation architecture, and is roughly divided into the following two cases as shown in FIGS. 30A to 30C:

(a) a case where the ignited region does not include any pre-labeled cell of the block having the label; and (b) a case where the ignited region includes the pre-labeled cell of the block having the label.

In the case (a) (FIG. 30A), a new label number is produced in the label control circuit 17 in the same manner as in the conventional architecture, and set to the cell network 14. In the case (b), boundary information of the pre-labeled cell of the block successively processed by the SIA needs to be reflected in the segmentation result. The following two cases are considered concerning this respect.

[Case where the pre-labeled cell of the block whose ignited region has the label is included]

(b-1) When the cell (pre-labeled cell) of the pre-labeled portion having one label is ignited, or when the ignited pre-labeled cells have the same label number (FIG. 30B), the label number is written in the ignited region.

(b-2) When the pre-labeled cells having different label numbers are in the same ignited region (FIG. 30C), exceptional processing is performed. For example, the label having a smallest competitive label number is written in the existing ignited region. Additionally, with respect to the image block in which the image segmentation has been already ended, a combination with the competitive label number is written into the table in the SIA control circuit 18. Moreover, the exception signal is set to the SIA control circuit 18.

When the image segmentation ends in each block, the label number is written into the image segmentation memory through an SIA controller.

The above-described operation is performed until the image segmentation of all the blocks ends.

A flow of the processing of the label control circuit 17 will be summarized hereinafter.

[Label Control]

Step 1: The flip flop which detects the falling of the z signal holds z in the previous clock cycle, and detects the falling as compared with the existing z signal (when z is 1→0, the output is "1").

Step 2: It is decided from the pre_labeled signal whether or not the ignited region includes the pre-labeled cell.

Step 3:

(a) Case where the Ignited Region does not Include any Pre-Labeled Cell

The new label number is produced in the counter and output to the cell network 14 from the label output port label, and simultaneously the label write signal labelw is set to the cell network 14.

(b) Case where the Ignited Region Includes the Pre-Labeled Cell

The label information of the pre-labeled cell is obtained from the label input port label.

(b-1) When there is a type of label number, the number is output to the cell network 14 from the label output port label, and the label write signal labelw is set and written.

(b-2) If the ignited cells in the pre-labeled cells have two or more different label numbers, and the label numbers are competitive, the exception signal exception is set to 1, and the competitive label number is sent to the SIA control circuit 18. The label number (e.g., the smallest label number) in the competitive label numbers is output to the cell network 14 from the output port label, and the label write signal labelw is set and written.

When the data of image segmentation is requested from the higher level applications (such as image recognition and movement detection), the SIA control circuit 18 refers to the address raddr of the requested pixel to read the label number label from the image segmentation memory 15. Additionally, concerning the exceptional label number, the label number SIA_label rewritten in accordance with the table is read.

It should be noted that when the label number is a competitive label, competition of the label in the image segmentation memory 15 is removed beforehand by post-processing. That is, it is also possible to change the label using the SIA control circuit 18. In this case, it is not necessary to refer to the label table every time there is a request from the upper application.

(Effect)

To verify effectiveness of the present invention, the image segmentation apparatus having the image segmentation architecture based on the BAO and SIA techniques of the present invention was designed into an integrated circuit using hardware description language Verilog-HDL.

Figure 31:
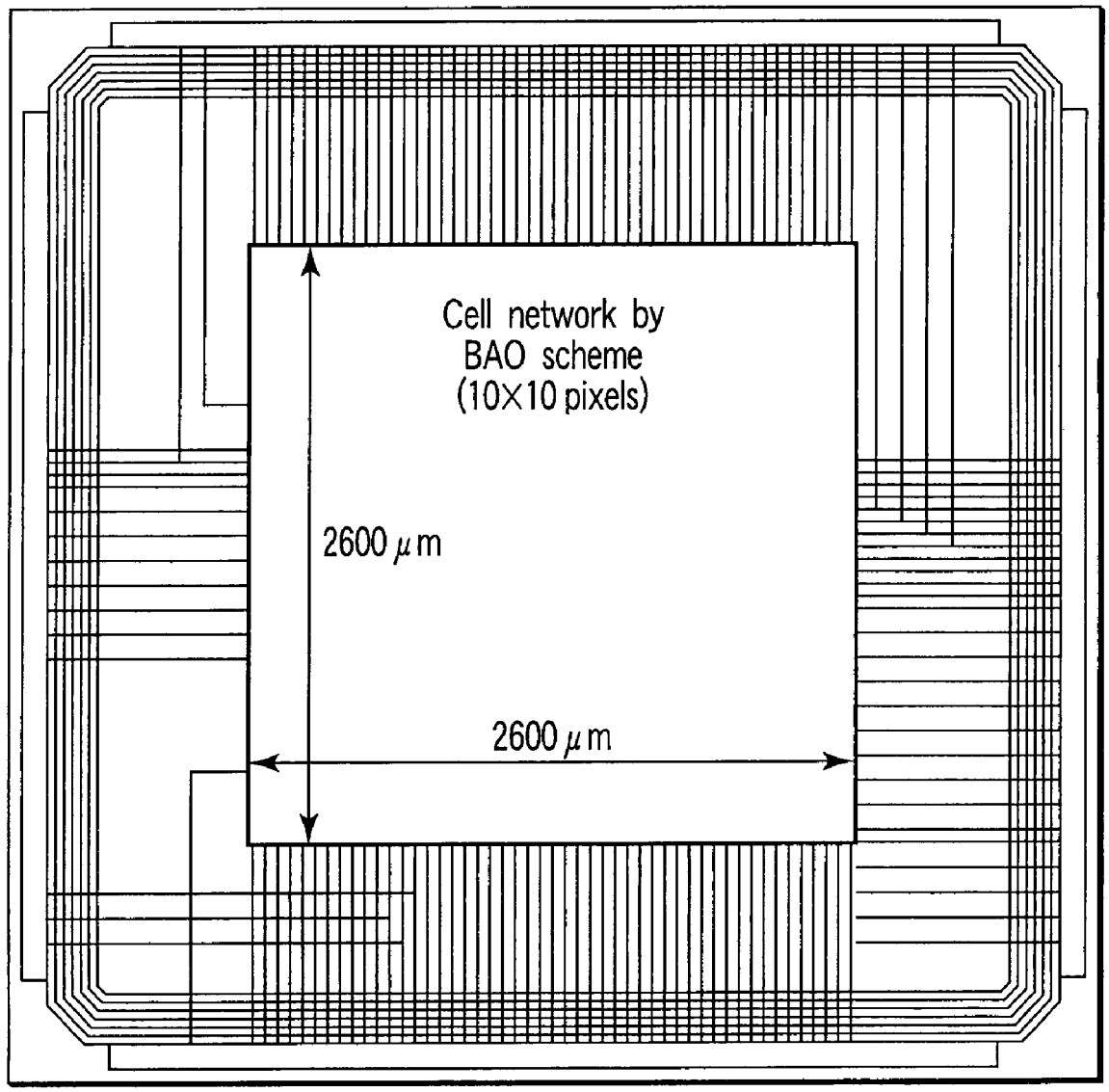
FIG. 31 is a diagram showing a layout of a fabricated test chip in the image segmentation apparatus of an image segmentation architecture based on the BAO and SIA systems of the present invention.

The prepared Verilog-HDL description was subjected to logic synthesis and automatic placement and routing using a standard cell library of three-metal layer wiring 0.35 μm CMOS technology to prepare a layout. FIG. 31 shows the layout.

The power consumption of the proposed architecture was estimated by simulation based on the design result using circuit simulation software (HSPICE). Results are shown in Table 2. The simulation was performed with respect to an input pattern in which the power consumption was maximized. Assuming that a clock frequency is 10 MHz, the power is 6.81 mW, and it was possible to save the power consumption by about 75% as compared with the conventional method.

TABLE 2

Comparison Result of Power Consumption of proposed BAO Architecture with conventional Architecture
(0.35 μm CMOS technology, 10-MHz clock frequency, HSPICE Simulation)

|  | Conventional architecture | Architecture of present invention | Reduction ratio |
|---|---|---|---|
| Average power consumption | 24.4 mW at 10 MHz | 5.80 mW at 10 MHz | 76.2% |
| Maximum power consumption | 30.9 mW at 10 MHz | 6.81 mW at 10 MHz | 78.0% |

Furthermore, the effectiveness of the SIA technique was verified. When the SIA is used, even the image having a large size can be processed by pipeline processing while the input image is divided into several blocks. By calculation from the above-described design example, for example, when a 33×25 pixel size is realized as one chip, the image segmentation is possible at 15 μsec at 10 MHz on average. Therefore, for example, when the image having the VGA size (640×480 pixels) is considered, as shown in FIG. 16, 33×25 is regarded as one block, the image is divided into 20×20 blocks, and each block is processed by pipeline. Accordingly, the processing is possible at about 9 msec at 10 MHz with an average power consumption of 19.8 mW at 10 MHz and a chip area of 43 mm².

In this manner, in the present invention, a small area/low power consumption real-time image segmentation architecture has been proposed using the boundary active only (BAO) scheme and subdivided image approach (SIA). According to the present invention, it is possible to appropriately control the cell which performs the state transition, and the power consumption can be reduced by about 75% as compared with the conventional architecture. Furthermore, the proposed architecture has a higher rate as compared with the targeted real-time processing, and therefore the SIA for successively performing the processing using the cell network having a small 33×25 pixel size is used. Accordingly, even the large-scaled image having the VGA size can be processed in real time with the low power consumption not only in the most advanced CMOS technology but also in the inexpensively established 0.35 μm CMOS technology.

INDUSTRIAL APPLICABILITY

An image segmentation apparatus, an image segmentation method, and an image segmentation integrated circuit according to the present invention are applicable to an image segmentation/extraction integrated circuit for image segmentation/extraction in an image recognition system, mobile object detection system, digital camera, digital video camera, robot vision, authentication system by face recognition, security system, artificial intelligence system and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image segmentation method in which a region belonging to the same category is specified from an input image by a pixel unit to identify an image segmentation region, the method comprising:
   a block dividing step of dividing the input image into a plurality of blocks;
   an initialization step including a step of bringing all a plurality of cells, which are disposed for each pixel of the divided block and which shift in non-ignited, self-ignitable, and ignited states, into the non-ignited state, a step of calculating a coupling weight of each of the plurality of cells with an adjacent cell based on a pixel value of the pixel corresponding to each of the plurality of cells, a step of determining one or more leader cells including candidates of self-ignitable cells from the plurality of cells based on a calculation result of the coupling weight, and a step of setting a global suppressor which is a variable to determine whether or not a cell being ignited exists in the plurality of cells to an initial value;
   a first detection step of detecting the leader cell as the self-ignitable cell in order from the plurality of cells;
   a self-ignition step of bringing the self-ignitable cell detected in the first detection step into the ignited state;
   a second detection step of detecting an ignitable cell from adjacent cells based on the coupling weight calculation result with the respective adjacent cells with respect to the cells in the ignited state including the leader cell;
   an ignition step of bringing the cell detected in the second detection step into the ignited state; and
   an extinguishing step of bringing all the cells in the ignited state in an extinguished state in a case where the corresponding cell is not detected in the second detection step,
   the method including: a first processing routine of repeatedly performing the ignition step until the corresponding cell is not detected in the second detection step to complete the image segmentation of the region; a second processing routine of repeatedly performing a series of processing by the self-ignition step, the second detection step, the ignition step, and the extinguishing step until there is no leader cell in the non-ignited state in the first detection step to complete the image segmentation of all the regions; and a third processing routine of successively synthesizing processing results of the image segmentation region obtained for each divided block to obtain the whole image segmentation region, wherein
   the block dividing step comprises dividing the plurality of blocks in such a manner that each boundary overlaps with an adjacent block by at least one or more pixels, and
   the step of determining the leader cell in the initialization step comprises determining a cell as the leader cell beforehand in a case where the cell included in a certain image segmentation region of the block that has completed the image segmentation exists in a portion overlapping with the adjacent block.

2. The image segmentation method according to claim 1, wherein the first processing routine comprises: operating the plurality of cells in parallel; calculating a sum of coupling weights in accordance with the state of each adjacent cell; and shifting a cell whose sum is not less than a certain threshold value into the ignited state to grow a divided region, while bringing only a cell in the vicinity of a boundary of the region growth into an active mode, bringing the other cells into a standby mode, operating only the cell in the active mode, and omitting the processing of the cells in the standby mode.

3. The image segmentation method according to claim 1, further comprising:
deciding three conditions,
Condition 1: the cell itself is already ignited;
Condition 2: the cell already belongs to a certain divided region; and
Condition 3: neither of Conditions 1 and 2 is satisfied and no adjacent cell is ignited in the standby mode of the cell; and
omitting processing of calculating a sum of coupling weights, detecting a cell whose sum is not less than a certain threshold value as the ignitable cell, and successively shifting the cell into the ignited state in the processing of the first processing routine in a case where any of the three conditions is satisfied.

4. An image segmentation apparatus in which a region belonging to the same category is specified from an input image by a pixel unit to identify an image segmentation region, and an image of an optional image segmentation region is selectively output, the apparatus comprising:
an input image memory in which each pixel value of the input image is stored;
a cell network comprising a plurality of cells which are disposed for each pixel of a block at a time when the input image is divided into a plurality of blocks having predetermined sizes and shapes and which shift in non-ignited, self-ignitable, and ignited states, and a plurality of coupling weight registers disposed between adjacent cells in the plurality of cells to hold a coupling weight between the cells;
a coupling weight calculation circuit which reads each pixel value of the block designated as a processing object in the plurality of blocks in order from the input image memory to associate the values with the plurality of cells and which calculates the coupling weight between the adjacent cells based on the pixel value corresponding to each of the plurality of cells, the calculated coupling weight being held in the plurality of coupling weight registers;
a leader cell determination circuit to determine a cell whose sum of coupling weights with the adjacent cell exceeds a standard value as the leader cell based on the coupling weight calculated by the coupling weight calculation circuit;
region distinguishing means for repeatedly executing processing including deciding from a held value of the coupling weight register disposed adjacent to each of the plurality of cells whether or not ignition is possible, shifting the leader cell determined by the leader cell determination circuit into the ignited state in order, and selecting the ignitable cell from the cells adjacent to the ignited leader cell to shift the ignitable cell into the ignited state, and distinguishing the image segmentation region of the selected block from the region of the cell brought into the ignited state;
a label control circuit which attaches and stores different labels to the respective pixels of the selected block for at least each adjacent region of the distinguished image segmentation region;
an auxiliary dividing control circuit which selects one of the plurality of blocks in order as the processing object to designate a range of the block and which interconnects image segmentation regions of the plurality of blocks successively distinguished by the region distinguishing means based on a label of each pixel attached by the label control circuit and which specifies the image segmentation region of the whole input image;
a divided region storage circuit to store information of all the cells in which the image segmentation region of the whole input image is specified by the auxiliary dividing control circuit; and
an output image memory in which the pixel value corresponding to each cell of an optional image segmentation region is stored based on a stored content of the divided region storage circuit.

5. The image segmentation apparatus according to claim 4, wherein the auxiliary dividing control circuit designates ranges of the plurality of blocks so that each boundary between the blocks overlaps with an adjacent block by at least one or more cells, and
the leader cell determination circuit determines a cell as the leader cell beforehand in a case where the cell included in a certain divided region of the block that has completed the image segmentation exists in a pre-labeled portion overlapping with the adjacent block of the block that is the processing object.

6. The image segmentation apparatus according to claim 5, wherein the cell network comprises: a data production circuit to produce data indicating a boundary of the block which is the processing object and data of a global suppressor which is a variable to determine whether or not the cell being ignited exists in the plurality of cells; and a label number holding circuit which holds a label number attached by the auxiliary dividing control circuit, and
the label control circuit receives boundary data of each processing block, the label number, and the global suppressor from the cell network, writes the same label number in the same ignited region, and obtains an exception signal in each block and the label number to notify the auxiliary dividing control circuit.

7. The image segmentation apparatus according to claim 6, wherein the auxiliary dividing control circuit performs a first decision to decide whether or not the ignited region shifted to the ignited state by the region distinguishing means includes a cell having a label in a pre-labeled portion overlapping with the adjacent block which has completed the image segmentation,
holds a new label number produced in the label control circuit in the ignited region of the cell network in a case where it is decided in the first decision that the cell having the label is not included;
performs a second decision to decide whether or not the cell has an ignited label number of the pre-labeled portion or whether or not a plurality of ignited cells of the pre-labeled portion have the same label number or whether or not a plurality of ignited cells of the pre-labeled portion have different label numbers in a case where it is decided in the first decision that the cell having the label is included;
rewrites the label number to be held in the cell network into the label number of the included cell in a case where it is decided in the second decision that the included cell has the label number or the included cells have the same label number;
writes a selected label number from competitive label numbers into the existing ignited region according to a selection algorithm in a case where it is decided in the second decision that the cells have different label numbers,
writes said competitive label numbers and said selected label number in an internal table to designate rewriting of said label numbers concerning the block in which the image segmentation has already ended, stores the label number in the divided region storage circuit in a case where the image segmentation ends in the block being processed, and executes the above-described processes until the image segmentation of all the blocks ends.

8. The image segmentation apparatus according to claim 6, wherein the cell network comprises a pre-labeled cell processing circuit which distinguishes a pre-labeled cell from another cell to process the pre-labeled cell, the pre-labeled cell processing circuit comprises: a previous label register to store the label number as a segmentation result in the previous image segmentation; a label comparison unit which compares the label number stored in the previous label register with the label number of the presently ignited leader cell; a flag register to store a flag indicating a candidate of pre-label ignition for use in broadcasting; and an input/output control circuit which controls input/output of signals of the previous label register, label comparison unit, and flag register, and the input/output control circuit basically broadcasts the label number stored in the previous label register to all the other pre-labeled cells in a case where the corresponding pre-labeled cell is ignited, and broadcasts the label number of the pre-labeled cell designated by the value held in the flag register in a case where there are a plurality of ignited pre-labeled cells.

9. The image segmentation apparatus according to claim 8, wherein the pre-labeled cell processing circuit does not receive designation by the value of the flag register with respect to the simultaneously ignited pre-labeled cells in which the broadcasted label number matches the label number of the corresponding pre-labeled cell stored in the previous label register.

10. The image segmentation apparatus according to claim 8, wherein the cell network further comprises a token control circuit which executes a control so as to selectively permit broadcasting based on a selection result of the processing object block with respect to the pre-labeled cell processing circuit.

11. An integrated circuit comprising all circuits integrated for image segmentation in which a region belonging to the same category is specified from an input image by a pixel unit to identify an image segmentation region, and an image of an optional image segmentation region is selectively output, the circuit comprising:

an input image memory in which each pixel value of the input image is stored;

a cell network comprising a plurality of cells which are disposed for each pixel of a block at a time when the input image is divided into a plurality of blocks having predetermined sizes and shapes and which shift in non-ignited, self-ignitable, and ignited states, and a plurality of coupling weight registers disposed between adjacent cells in the plurality of cells to hold a coupling weight between the cells;

a coupling weight calculation circuit which reads each pixel value of the block designated as a processing object in the plurality of blocks in order from the input image memory to associate the values with the plurality of cells and which calculates the coupling weight between the adjacent cells based on the corresponding pixel value, the calculated coupling weight being held in the plurality of coupling weight registers;

a leader cell determination circuit to determine a cell whose sum of coupling weights with an adjacent cell exceeds a standard value as the leader cell based on the coupling weight calculated by the coupling weight calculation circuit;

region distinguishing means for repeatedly executing processing including deciding from a held value of the coupling weight register disposed adjacent to each of the plurality of cells whether or not ignition is possible, shifting the leader cell determined by the leader cell determination circuit into the ignited state in order, and selecting the ignitable cell from the cells adjacent to the ignited leader cell to shift the ignitable cell into the ignited state, and distinguishing the image segmentation region of the selected block from the region of the cell brought into the ignited state;

a label control circuit which attaches and stores different labels to the respective pixels of the selected block for at least each adjacent region of the distinguished image segmentation region;

an auxiliary dividing control circuit which selects one of the plurality of blocks in order as the processing object to designate a range of the block and which interconnects image segmentation regions of the plurality of blocks successively distinguished by the region distinguishing means based on a label of each pixel attached by the label control circuit and which specifies the image segmentation region of the whole input image;

a divided region storage circuit to store information of all the cells in which the image segmentation region of the whole input image is specified by the auxiliary dividing control circuit; and an output image memory in which the pixel value corresponding to each cell of an optional image segmentation region is stored based on a stored content of the divided region storage circuit.

* * * * *